US012188690B2

(12) United States Patent
Ireland et al.

(10) Patent No.: US 12,188,690 B2
(45) Date of Patent: Jan. 7, 2025

(54) SOLAR RECEIVER

(71) Applicant: ODQA RENEWABLE ENERGY TECHNOLOGIES LIMITED, London (GB)

(72) Inventors: Peter Ireland, Oxford (GB); Tsun Holt Wong, Oxford (GB); Gediz Karaca, London (GB); Ahmed Refaat, London (GB); Chiang Ngai, Oxford (GB); Edwin Wood, Witney (GB)

(73) Assignee: ODQA RENEWABLE ENERGY TECHNOLOGIES LIMITED, London (GB)

( * ) Notice: Subject to any disclaimer, the term of this patent is extended or adjusted under 35 U.S.C. 154(b) by 0 days.

(21) Appl. No.: 17/400,857

(22) Filed: Aug. 12, 2021

(65) Prior Publication Data

US 2022/0049876 A1    Feb. 17, 2022

Related U.S. Application Data

(63) Continuation of application No. PCT/GB2020/050359, filed on Feb. 14, 2020.

(30) Foreign Application Priority Data

Feb. 15, 2019 (GB) .................. 1902154.2

(51) Int. Cl.
F24S 20/20 (2018.01)
F24S 23/00 (2018.01)
F24S 40/52 (2018.01)

(52) U.S. Cl.
CPC .............. *F24S 20/20* (2018.05); *F24S 23/12* (2018.05); *F24S 40/52* (2018.05); *F24S 2020/23* (2018.05); *Y02E 10/40* (2013.01)

(58) Field of Classification Search
CPC ......... Y02E 10/40; Y02E 10/44; Y02E 10/47; Y02E 10/46; F24S 23/70; F24S 20/20;
(Continued)

(56) References Cited

U.S. PATENT DOCUMENTS 3,892,433 A * 7/1975 Blake ...................... F03B 13/06
126/573
3,920,413 A * 11/1975 Lowery ................. F24S 70/225
205/213

(Continued)

FOREIGN PATENT DOCUMENTS

AU            706605 B2    6/1999
AU        2009240998 A1   11/2009
(Continued)

OTHER PUBLICATIONS

International Search Report (six pages) dated May 26, 2020 in corresponding PCT Application No. PCT/GB2020/050359.
(Continued)

*Primary Examiner* — Wesley G Harris
(74) *Attorney, Agent, or Firm* — Crowell & Moring LLP; John C. Freeman

(57) ABSTRACT

A solar receiver and associated components, systems and methods for use with a concentrated solar power plant. The solar receiver including a heat-absorbing solid body, an optical arrangement configured to direct light on to the heat-absorbing solid body, and a heat exchanger cowl proximate the heat-absorbing solid body arranged to provide a flow of working fluid over the rotor. In use, the light from the optical arrangement heats the heat-absorbing solid body which in turn heats the working fluid proximate the heat-absorbing solid body. The heat-absorbing solid body is movable relative to the optical arrangement from a first
(Continued)

position to a second position such that the heat-absorbing solid body does not overheat.

30 Claims, 14 Drawing Sheets

(58) Field of Classification Search
CPC ........ F24S 23/12; F24S 40/52; F24S 2020/23; F03G 6/06; F03G 6/065
USPC ................ 126/714, 600; 136/246; 60/641.15
See application file for complete search history.

(56) References Cited

U.S. PATENT DOCUMENTS

| | | | | |
|---|---|---|---|---|
| 3,924,604 A * | 12/1975 | Anderson | ................ | F24S 30/40 126/606 |
| 4,148,300 A * | 4/1979 | Kaufman, Sr. | ......... | F24S 23/00 126/684 |
| 4,212,290 A * | 7/1980 | Warnken | ................. | F24S 23/70 126/684 |
| 4,236,383 A * | 12/1980 | Frosch | .................... | F24S 50/00 60/524 |
| 4,253,445 A | 3/1981 | Wilson | | |
| 8,944,046 B2 | 2/2015 | Worthington | | |
| 9,897,076 B1 | 2/2018 | Johnson, Jr. | | |
| 2002/0083946 A1* | 7/2002 | Karni | ..................... | F24S 10/80 126/648 |
| 2010/0269817 A1* | 10/2010 | Kelly | ...................... | F24S 23/79 126/698 |
| 2013/0074829 A1* | 3/2013 | Worthington | ........... | F24S 80/40 126/714 |

FOREIGN PATENT DOCUMENTS

| | | |
|---|---|---|
| CN | 102959344 A | 3/2013 |
| CN | 208238278 U | 12/2018 |
| CN | 208458290 U | 2/2019 |
| DE | 10 2010 063116 A1 | 6/2012 |
| EP | 3136018 A1 | 3/2017 |
| JP | S 58130951 A | 8/1983 |
| JP | 2011033242 A | 2/2011 |
| SU | 1506241 A1 | 9/1989 |
| WO | WO-8404806 A1 * 12/1984 | ................ F24J 3/02 |
| WO | 01/61254 A1 | 8/2001 |
| WO | 2014/194017 A1 | 12/2014 |

OTHER PUBLICATIONS

Written opinion (seven pages) May 26, 2020 in corresponding PCT Application No. PCT/GB2020/050359.
United Kingdom IPO Search Report (four pages) dated Oct. 14, 2019 in corresponding GB Patent Application No. GB1902154.2.
Official Action dated Jun. 3, 2022 (4 pages) from corresponding European application 20709660.3.
Pierson, Hugh O., Handbook of Refractory Carbides and Nitrides, Noyes Publications, Westwood, New Jersey, U.S.A., 1996, three pages including p. 203.
Daryabeigi, Kamran et al, Heat Transfer Measurement and Modeling in Rigid High-Temperature Reusable Surface Insulation Tiles, Published Online by : American Institute of Aeronautics and Astronautics, Jun. 14, 2012, pp. 1-14.
Liu, Zeyu et al., Thermal transport in superconducting niobium nitride: A first-principles study, Appl. Phys. Letters, vol. 118, Published Online by AIP Publishing: Jan. 27, 2021, pp. 043102 and 043102-1-7.
Official Action dated Jun. 30, 2022 (15 pages) from corresponding Saudi Arabia application 521430067.
Examination Report dated Nov. 4, 2022 (6 pages) from corresponding European application No. 20709660.3.
Office Action dated May 20, 2023 from corresponding Chinese Application No. 202080027846.8 (13 pages).
Office Action dated Feb. 13, 2023 from corresponding Indian Application No. 202147041302 (5 pages).
Response to EPO Communication dated Mar. 3, 2023 (9 pages) in corresponding European Patent Application No. 20709660.3; Copy of Claim Claims as submitted (4 pages); Copy of marked-up claims as submitted (4 pages).

* cited by examiner

SOLAR RECEIVER

This application is a continuation application under 35 U.S.C. § 120 of Patent Cooperation Treaty Patent Application No. PCT/GB2020/050359, filed on Feb. 14, 2020, the entire contents of which are incorporated herein by reference.

Patent Cooperation Treaty Patent Application No. PCT/GB2020/050359, filed on Feb. 14, 2020, claims priority under 35 U.S.C. § 119(a) of Great Britain Patent Application No. GB 1902154.2, filed on Feb. 15, 2019, the entire contents of which are incorporated herein by reference.

BACKGROUND OF THE INVENTION

Field of the Invention

The present invention relates to solar power systems, their components, and methods for using the same. More particularly, the present invention relates to solar receivers for use in concentrated solar power applications.

Related Art

Concentrated solar power systems use a series of heliostats including mirrors and/or lenses to concentrate the sunlight incident on large surface areas onto a smaller area from which the energy may be harnessed. In commercial applications, banks of heliostats are generally positioned in proximity to a tower or mast supporting a solar receiver. The heliostats are positioned such that they will reflect incident solar radiation towards the tower's receiver which absorbs the energy and passes it to a system for subsequent conversion to electrical energy. The heliostats are typically fitted with a tracking system that allows them to adjust alignment relative to the position of the sun to ensure that the incident light continues to be directed towards the tower throughout the day. Power tower arrangements and parabolic trough/trench solar plants are the most common designs of concentrated solar power plant.

Solar receivers are generally divided between solid, liquid and gas types. In principle, the solar radiation is converted into heat energy in the solid, liquid or gas medium of the receiver. The heat from the receiving material is then usually transferred to a working fluid via processes such as conduction and/or convection. The working fluid is then ultimately used in a thermodynamic cycle to produce work. In liquid or gas solar receivers, the fluid receiving the solar radiation may also be utilized as the working fluid. In general, the absorbing surface of the receiver should have a high absorptance to enable absorption of as great a proportion of the incident solar radiation as possible.

Tubular receivers are the most common concentrated solar power receivers and generally include a metal tube containing a thermally conductive fluid. Light is concentrated onto the tube and the fluid within becomes heated. The energy collected by the fluid may then be utilized in the production of electricity.

Molten salt systems operate in a similar manner to tubular receivers. In a molten salt receiver, incident light is used to heat a solid salt reservoir which then melts when its temperature is increased beyond the melting point of the salt. The molten salt may then flow through standard heat exchange systems to heat the working fluid. Molten salts are considered advantageous due to their capability to store heat energy in the molten salt for long periods of time if the reservoirs are suitably insulated. The molten salt reservoir may then be utilized to generate electricity during periods of low light, such as during the night. However, there are several challenges in the use of molten salt systems including the safety risk posed by large quantities of high temperature liquids, corrosion of components caused by the salts, the freezing of salts in periods of low light, and the associated contraction and expansion of matter experienced during operating conditions.

Falling particle solar receivers (also known as solid particle solar receivers) replace molten salts with flowable solid particles such as sand. In a falling particle system, light is generally concentrated onto flowing curtains of the particulate which then fall under gravity and pass through standard heat exchange systems to impart their thermal energy to the working fluid. The particulates are then usually returned to the top of the receiver for further use in the particulate curtain. Falling particle systems often suffer from challenges posed by the materials involved, inefficiency of heat transfer between the heated solids and working fluid, and the technical challenges posed by conveying large quantities of solid material in a continuous manner.

Gas based receivers focus the incident light onto a thermally conductive gas which may then be used to directly drive turbines. Gas based systems often employ honeycomb and porous structures around the absorbing gas to capture additional thermal radiation which is then transferred to the working gas. Gas based receivers to tend to suffer from low absorptance and consequently low efficiency of energy conversion.

Regardless of the absorbing medium, solar receivers are designed to operate within specific ranges of light concentration factor. The light concentration factor, c, is defined as the thermal flux ($W/m^2$) that is incident on surface of the receiver to be heated, divided by the corresponding thermal flux arriving at the power station from the sun (also known as the 'insolation'). The concentration factor has a direct effect on the efficiency of power generation and it is a sensible intent for a designer to try to maximise c. Typically, concentrated solar power plants operate at c values of around 20 to 100, with some Stirling dish designs achieving c values of up to 2000. Greater values of c represent increased energy density which in turn represents a greater potential energy resource that may be harnessed by the receiver. Increasing the c value of a concentrated solar power plant will induce higher temperatures in the receiver medium. The maximum value of c at which a receiver can operate is thus limited by the thermal tolerances of the receiver and its materials. For example, temperatures in excess of 1000° C. may be achieved as the value of c increases. In systems such as the molten salt systems, such temperatures may induce the thermal decomposition of molten salts. Structural components may also be put at risk by a high c value as structural steel may begin to melt at temperatures of around 1400° C. Receivers may also be at risk from the effects of thermal expansion and contraction upon components in situations where the energy incident upon the receiver is variable, or where the power plant cycles between active and inactive states.

At high values of c, the heat flux may be particularly fierce. For example, if a power station were able to achieve a concentration factor of 10,000 and the insolation was 1,600 $kW/m^2$, then the heat flux at the surface of the solar collector would be 16 $MW/m^2$. Such a high heat flux would engender large temperature gradients and extremely high temperatures within and at the surface of the solar receiver. Such high temperatures and temperature gradients would significantly limit the life of the receiving material.

Generally, the greater the density of energy incident upon the receiving surface, the shorter the lifespan of the receiver. The mean thermal irradiance, amplitude of irradiance, period, and exposure time of the radiative cycles may all impact the long term properties of the materials used in the construction of receivers. Even at typical values of 20 to 100 c, the absorptance of receivers may significantly degrade over time, causing decreases in the thermal performance of the receiver in the long term. Furthermore, receivers are an expensive component of concentrated solar power plants. It is estimated that a solar receiver constitutes up to 20% of the initial capital costs of construction of a concentrated solar power plant. It is therefore desirable to avoid or delay the need to replace receivers that show degraded performance.

In effect, established concentrated solar power plant designs can only exploit limited values of c by virtue of the materials they use. Higher values of c increase the theoretical efficiency of a solar receiver, and there is therefore a need for solar receivers that allow for high values of c while avoiding the drawbacks commonly encountered with the systems known in the art.

SUMMARY OF THE INVENTION

According to the present invention there is provided a solar receiver for a concentrated solar power station as described hereafter. Further preferable features of the solar receiver of the present invention are defined in the remaining portions of this description.

According to a further aspect of the present invention there is provided a method for converting light into electrical energy as described hereafter. Further preferable features of the method of the present invention are defined in the remaining portions of this description.

One aspect of the invention provides a heat-absorbing solid body for use in a solar receiver, the heat-absorbing solid body comprising a body, and one or more surfaces configured to receive and store solar radiation in the form of heat. The heat-absorbing solid body may be any suitable shape including, but not limited to, a cylinder, disk, sphere, hemisphere, belt, blade, wedge, cone, tube, pipe, conduit, etc. As such, the heat-absorbing solid body may have cross sections that are substantially square, triangular, rectangular, circular, elliptic, v-shaped, irregularly shaped, or any other suitable shape. The cross sections may be solid or may comprise one or more hollow regions. The heat-absorbing solid body may comprise one or more support structures that enable the heat-absorbing solid body to move and/or rotate while additionally, or alternatively, guiding the heat-absorbing solid body such that it moves in a circuit or closed loop. Suitable support structures include a central axle, shaft, pivot, bearing or similar feature configured to allow the heat-absorbing solid body to move and/or rotate. Advantageously, heat-absorbing solid body may be a rotor, belt or cable to allow the heat-absorbing solid body to be moved continually at high speeds. Where the heat-absorbing solid body is a cable or belt, the cable or belt may be mounted to a support structure of pulleys and guide conduits configured to enable the cable or belt to move around a circuit. Where the heat-absorbing solid body is a rotor, the rotor may be a disk, cone, frustoconical, or cylindrical shaped with a support structure including a central axle and bearing arrangement to allow rotation. The height of the rotor may be less than, equivalent to, or greater than the circumference of the rotor. It may be advantageous to use a rotor with a height smaller in magnitude than the circumference of the rotor due to frictional considerations, air flow dynamics and heat dispersion characteristics. In other situations, it may be advantageous to use a rotor with a height greater in magnitude than the circumference of the rotor to provide a greater exposed surface area upon which solar radiation can be received.

In use, the heat-absorbing solid body moves and/or rotates, driven by any suitable driving means such as a motor. The heat-absorbing solid body is exposed to various concentrations of solar radiation. In practice, the heat-absorbing solid body moves from a first position to a second positon, and may move in a circuit, a closed loop, rotate fully through 360° or may rotate partly through rotation less than 360°. The movement or rotational direction of the heat-absorbing solid body may be constant, or alternatively, the heat-absorbing solid body may change movement or rotational direction. As such, the heat-absorbing solid body may move or rotate back and forward to rock between two end positions that may be around a rotational axis. The heat-absorbing solid body may move and/or rotate in a single two-dimensional plane, or may move and/or rotate through multiple planes in the course of movement and/or rotation. It may be advantageous to rotate the heat-absorbing solid body in a constant direction through 360 degree rotation in a single two dimensional plane.

The heat-absorbing solid body may be any suitable size depending upon the intended application. A solar tower in a large power plant will require a larger heat-absorbing solid body than a comparable receiver to be employed on a small localised system. In practice, the size of the heat-absorbing solid body is determined by the capacity requirement of the installation in which it is housed and the capability of the working fluid and heat transfer system by which it is accompanied. In general, the heat-absorbing solid body may have a diameter, width, length or dimension of between 1 cm and 10000 cm. Preferably, the heat-absorbing solid body may have a diameter and/or length of between 50 cm and 2000 cm. In other preferable examples, the heat-absorbing solid body may have a diameter and/or length of between 2 cm and 500 cm. In additional preferable examples, the heat-absorbing solid body may have a diameter and/or length of between 5 cm and 300 cm. In one particular example where the heat-absorbing solid body is a rotor in a 1 MW power plant operating at 10,000 c, a cylindrical rotor of approximately 35 cm in height and up to 200 cm in diameter may be utilized. In another particular example where the heat-absorbing solid body is a rotor in a 50 kW to 1 GW power plant operating at approximately 10,000 c, a frustrum shaped rotor of between 50 cm and 2000 cm in height and/or diameter may be used.

Under normal operating conditions, the heat-absorbing solid body may be exposed to working temperatures in excess of 2500° C., depending upon the heat concentration factor to be adopted. Consequently, the heat-absorbing solid body may be at least partially formed from a refractive material capable of withstanding high temperatures. The heat-absorbing solid body may include a material with a melting point in excess of 1000° C. Preferably, the heat-absorbing solid body may include a material with a melting point in excess of 1500° C. More preferably, the heat-absorbing solid body may include a material with a melting point in excess of 2000° C. In concentrated solar applications involving high values of light concentration, it may be particularly advantageous to form the heat-absorbing solid body from a material with a melting point in excess of 2500° C. It may also be advantageous to utilize a material which is capable of absorbing light across a large proportion of the ultraviolet, visible, and/or infrared spectrum. A material which also possesses a high refractive index may promote the absorption of solar energy at the surface of the heat-absorbing solid body and thus be particularly beneficial. Consequently, the heat-absorbing solid body may be formed from a material with a refractive index greater than 0.1. Preferably, the heat-absorbing solid body material may have a refractive index greater than 1. More preferably, the heat-absorbing solid body material may have a refractive index greater than 1.5. It may be advantageous to utilize a material with a refractive index greater than 2. Suitable materials may include ceramics, high refractive index polymers (HRIPs), metals, metal oxides, alloys, inorganic compounds, thermally tolerant organic compounds, and any other suitable material alone or in combination. It may be particularly advantageous to form the heat-absorbing solid body from steel, steel alloys, ceramics, zirconium, molybdenum, or any material with suitable properties to approximate a black body. Materials should also be selected with sufficient stress tolerances to ensure that the heat-absorbing solid body is capable of withstanding the forces acting upon it during movement and/or rotation.

The heat-absorbing solid body may additionally, or alternatively, be formed from, and/or at least partly coated with, a high temperature refractive material. Generally, the one or more surfaces of the heat-absorbing solid body upon which solar radiation will be incident may be coated to impart beneficial properties to the heat-absorbing solid body, as desired. The coating may extend around the outer periphery of the heat-absorbing solid body, extend across the entire outer surface of the heat-absorbing solid body, extend across one or more inner surfaces of a hollow heat-absorbing solid body, or cover selected portions of the heat-absorbing solid body surface, as necessary. The desirable properties for the coating may include the properties of high refractive index, high solar absorptance, high thermal tolerances and strength resistance, as previously described in relation to the materials that may be considered for use in the heat-absorbing solid body. In particular, it is desirable to utilize a coating material with a high solar absorptance. For example, a coating material may have a solar absorptance in excess of 0.5. Preferably the coating material may have a solar absorptance in excess of 0.8. More preferably, the coating material may have a solar absorptance in excess of 0.95. Suitable materials for use in the heat-absorbing solid body or coating include ceramics, cermets, zirconia, zirconium species, tantalum species, borosilicates, silicon species, carbon-based materials, metals, metal oxides, alloys, and any other suitable material alone or in combination. It may be particularly advantageous to form the coating from: thermally tolerant black paint (e.g. Pyromark 2500 available from Tempil Corporation); zirconium bromide; zirconium oxide, and/or its zirconium cermet; chromium oxide, and/or its nickel or chromium cermets; aluminium oxide, and/or its nickel, molybdenum and tungsten cermets; aluminium nitride, and/or its titanium cermet; silicon carbide; or any combination thereof. The properties of some suitable materials are provided below in Table 1.

The heat-absorbing solid body coating may be any suitable thickness. For example, the coating may have a thickness between about 0.1% to about 99% of the diameter, width, length or dimension of the heat-absorbing solid body. Preferably, the coating will have a thickness of between about 1% and 75% of the heat-absorbing solid body. Advantageously, the coating may comprise 2% to 50% of the length, width or diameter of the heat-absorbing solid body.

TABLE 1

Properties of materials for use with a solar receiver

| Material | Solar Absorptance | IR Emittance | Melting Point |
|---|---|---|---|
| Pyromark 2500 | 0.97 | 0.9 at 1000° C. | 1000-2000° C. |
| $ZrB_2$ | 0.93 | 0.09 at 102° C. | ~3200° C. |
| $Zr:ZrO_2$ | 0.96 | 0.05 at 80° C. | ~2700° C. |
| $Cr:Cr_2O_3$ | 0.868 | 0.088 at 121° C. | ~2400° C. |
| $Ni:CrO_x$ | 0.961 | 0.022 at 100° C. | ~1400° C. |
| SiC | ≥0.9 | — | ~2700° C. |
| $Ni:Al_2O_3$ | 0.94 | 0.18 at 100° C. | ~2000° C. |
| $Mo:Al_2O_3$ | 0.97 | 0.17 at 350° C. | ~2000° C. |
| $W-Ni:Al_2O_3$ | 0.9 | 0.15 at 500° C. | <2000° C. |
| $W:Al_2O_3$ | 0.95 | 0.106 at 400° C. | <2000° C. |
| ti:AlN | 0.95 | 0.07 at 82° C. | <1000° C. |

A heat-absorbing solid body comprising a coating may have a body formed from materials that would otherwise be unsuitable for use in an uncoated heat-absorbing solid body, such as lead, or materials with unsuitable optical properties. In such situations, the coating provides the thermal and optical functions necessary for the heat-absorbing solid body to absorb and transfer heat, while also protecting the body of the heat-absorbing solid body from damage resulting from exposure to high concentrations of solar radiation and high temperatures. It may be possible to separate or detach the heat-absorbing solid body coating from the body of the heat-absorbing solid body to allow repair or replacement of one or both components in isolation. For example, the coating material may be present in the form of one or more removable plates, platelets or tiles.

The heat-absorbing solid body may further comprise a thermally insulating material. The insulation may be positioned as a layer between any two components of the solar receiver. For example, the insulation may be positioned between the one or more absorbing surfaces of the heat-absorbing solid body and the central rotational axle, where present. The thermally insulating material may additionally, or alternatively, be positioned to protect particular components from high temperatures. When using a coated heat-absorbing solid body, the insulation may advantageously be positioned between the coating and the body of the heat-absorbing solid body. Additionally, or alternatively, the insulating material may be present in the form of plates or tiles. The plates or tiles may be of the same or different dimension to plates or tiles of coating material, where present. The plates and tiles of insulating material may interlock with each other, and/or plates or tiles of coating material, where present. In general, the insulating material may prevent the passage of heat from the surfaces of the heat-absorbing solid body that absorb solar radiation and components of the solar receiver with a lower thermal tolerance such as the movement and/or rotational means associated with the heat-absorbing solid body. The insulation may therefore prevent loss of heat away from the surface of the heat-absorbing solid body and provides the additional benefit of protecting the solar receiver components from degradation due to exposure to excessive temperatures. The insulation may be any suitable thickness. For example, the insulation may have a thickness between about 0.1% to about 200% of the diameter, width, length or dimension of the heat-absorbing solid body. Preferably, the insulation will have a thickness of between about 1% and 50% of the heat-absorbing solid body dimension. Advantageously, the insulation may comprise 2% to 40% of the diameter of the heat-absorbing solid body. Suitable insulating materials include ceramics, refractory materials, reinforced carbon materials, insulating thermally tolerant polymers, and combinations thereof.

The heat-absorbing solid body may be configured to move or rotate at high speeds. Where the heat-absorbing solid body is a belt, cable or shuttle, the heat-absorbing solid body may be configured to move at speed of up to 30 metres per second. Where the heat-absorbing solid body is a rotor, the rotor may be configured to rotate as speeds of between 0.1 revolutions per minute (rpm) and 20,000 rpm. Preferably, the rotor may be configured to rotate at speeds of between 25 rpm and 10,000 rpm. More preferably, the rotor may be configured to rotate at between speeds of 60 rpm and 6,000 rpm. In operation, the speed of movement of the heat-absorbing solid body may be manually adjustable by an operator. Advantageously, the movement speed of the heat-absorbing solid body may additionally, or independently, be controlled automatically in response to measurements of incident energy, system temperature or any other suitable measurement. For example, the rotational speed of a rotor may be increased in response to a higher density of incident solar energy upon the rotor and decreased in response to a decrease in solar energy incident upon the rotor, for example to maintain an approximately constant maximum temperature experienced by any part of the rotor. Alternatively, or additionally, the rotational speed of the rotor may be increased or decreased in response to an increase or decrease in temperature of one or more components of the solar receiver. In practice, the speed of the rotor may be adjusted in response to one or more measurements made by one or more sensors communicably coupled to a control system. Movement of the heat-absorbing solid body at high speeds reduces the duration of time across which the heat-absorbing solid body is exposed to high concentrations of solar radiation and allows management of temperature and limitation of the material's thermal degradation, as required.

The coated, or uncoated, surfaces of the heat-absorbing solid body upon which solar radiation is to be received may be substantially smooth. Smooth surfaces may reduce frictional resistance that would inhibit the movement of the heat-absorbing solid body. Alternatively, the absorbing surfaces of the heat-absorbing solid body may be porous, pitted, contoured, or of otherwise irregular unsmooth topography. Irregular surfaces may be configured to promote favourable interactions between the surface and the incident solar radiation. For example, pitted surfaces may act to trap light by encouraging diffuse reflection within the surface topography itself, resulting in any reflected light being directed towards other areas of the surface of the heat-absorbing solid body. A porous surface may have a greater surface area than a comparable smooth surface, thus allowing the high concentrations of incident light to be absorbed across a larger effective surface area. Heat energy present across a larger surface may subsequently be transferred more efficiently to a working fluid passing across the surface of the heat-absorbing solid body. The surface topography may be specifically configured to promote the transfer of heat from the surface of the heat-absorbing solid body to a working fluid by including fins, radiative elements, or similar structural features, across the surface of the heat-absorbing solid body. For example, where a porous material is used, the working fluid may advantageously be passed through the pores of the heat-absorbing solid body to improve transfer of heat from the surface of the heat-absorbing solid body to the working fluid.

In general, the heat-absorbing solid body is configured to receive solar radiation on the one or more surfaces arranged around the exterior of the heat-absorbing solid body. Where the heat-absorbing solid body is a rotor, and the rotor is a disk or cylinder, the absorbing surface may be the non-circular surface of the rotor. In some cases, it may be an advantage to use a rotor wherein the heated surface is on the inside surface of a rotating hollow cylinder, cone, or drum. Such a configuration would enable the absorbing surface to fail, and still be retained in the interior space of the rotor by centripetal acceleration. Where the heat-absorbing solid body is a cable or belt, any side or surface of the cable or belt may receive solar radiation, as desired. In examples where the heat absorbing solid body is hollow or has one or more cavities, solar radiation may be received on one or more outer surfaces of the heat absorbing solid body and then transferred to a working fluid flowing through the hollow space and over one or more internal surfaces of the heat absorbing solid body.

According to another aspect of the invention, there is provided a solar receiver for use in a concentrated solar power station at light concentration values of up to at least 10,000, the solar receiver comprising a heat-absorbing solid body as previously described, one or more optical arrangements configured to direct light on to the one or more surfaces of the heat-absorbing solid body; and one or more cowls configured to exchange heat between the one or more surfaces of the heat-absorbing solid body and a working fluid.

In one example of operation, light is passed via solar flux optics to one or more optical arrangements positioned in proximity to the heat-absorbing solid body. The optical arrangements direct the solar radiation on to the surface of the heat-absorbing solid body which absorbs at least part of the incident light as heat energy. The heat-absorbing solid body moves, carrying the heat energy away from the point at which the solar radiation is focused, and towards one or more heat exchanger cowls positioned in proximity to the one or more absorbing surfaces of the heat-absorbing solid body. A working fluid flows through the cowls, contacting the surface of the heat-absorbing solid body. The working fluid will generally be lower in temperature than the heated surface of the heat-absorbing solid body, and consequently, heat will be transferred from the surface of the heat-absorbing solid body to the working fluid. The hot working fluid may then be used to generate electricity. The movement of the heat-absorbing solid body will cause the cooled surface of the heat-absorbing solid body to subsequently pass the point towards which the optical arrangements direct the solar radiation. The solar radiation then re-heats the surface of the heat-absorbing solid body which, in turn, heats the working fluid.

The optical arrangement may be any suitable configuration of optical components that allow the solar radiation to be directed towards, and focused upon, the desired surface of the heat-absorbing solid body. For example, the optical arrangement may comprise one or more mirrors, lenses, prisms, reflective surfaces or any other suitable optical component. It may be advantageous to utilize compound parabolic concentrators (CPCs) as at least a component of one or more of the optical arrangements. The optical arrangement may additionally, or alternatively, comprise one or more light tubes. The one or more light tubes may each comprise a casing, an aperture formed in the casing, and one or more layers of reflective material arranged inside the casing. The one or more layers of reflective material may be configured to direct light towards and/or out of the aperture towards the one or more surfaces of the heat-absorbing solid body. The aperture may be any suitable shape including square, triangular, rectangular, circular, elliptic, irregularly shaped, or any other suitable shape. It may be advantageous to shape the aperture as a rectangular slot. The aperture of the light tube may have any dimensions relative to the dimensions of the heat-absorbing solid body. Preferably, the aperture has a length which is between 70% and 130% of the height of the heat-absorbing solid body. More preferably, the aperture has a length equivalent to the height of the heat-absorbing solid body. In general, the dimensions of the light tubes may contract as they approach the aperture to further concentrate the light passing through the tube.

The solar receiver may include any number of optical arrangements. Where a plurality of optical arrangements are present, it may be advantageous to position the optical arrangements of the solar receiver around the heat-absorbing solid body such that the distances and angles between the heat-absorbing solid body and each proximal optical component are generally equivalent. Spacing the optical arrangements in such a manner may allow the one or more surfaces of the heat-absorbing solid body to be heated consistently as the heat-absorbing solid body moves, provided a comparable concentration of solar radiation is passed via each of the plurality of optical arrangements. In solar receivers including a plurality of optical arrangements, the optical arrangements may be configured to each focus solar radiation onto different portions of the surface of the heat-absorbing solid body of similar or different surface areas, as required. In solar receivers including a plurality of light tubes in particular, each light tube may have a similarly shaped, or alternatively, a different shaped aperture. The aperture may include a lens or optical components configured to direct the light passing through the aperture towards a specific position on the surface of the heat-absorbing solid body. Directing the solar radiation to specific areas of the heat-absorbing solid body surface may allow the light to be converted to heat in the regions of the heat-absorbing solid body where, subsequently, the most efficient transfer to the working fluid takes place. Some configurations may allow for the transfer of light directly from solar flux optics to the heat-absorbing solid body without the use of intermediate optical arrangements. In these examples, light incident upon a solar flux optic such as a CPC may be directed onto the heat-absorbing solid body directly.

The clearance between the one or more optical arrangements and the heat-absorbing solid body may be minimized to reduce leakage of light. In configurations where the one or more optical arrangements are light tubes, the light tubes of the solar receiver are positioned with their apertures facing, or substantially facing, the one or more absorbing surfaces of the heat-absorbing solid body such that the clearance between the light tube and the heat-absorbing solid body is minimized while still enabling free movement and/or rotation of the heat-absorbing solid body during use, allowing for thermal expansion of the heat-absorbing solid body. In general, minimization of the clearance between the components of the solar receiver in proximity to the heat-absorbing solid body, and the heat-absorbing solid body itself, may reduce losses and leakage of light and/or heat. The solar receiver may further include one or more extending portions such as dividers, curtains, screens, partitions, flaps, shrouds, blinders, seals or similar. Where the optical arrangement is a light tube, the one or more extending portions may extend from the casing around and away from the aperture, and may be substantially parallel to the one or more surfaces of the heat-absorbing solid body. The extending portions, where present, are configured to reduce loss or leakage of light from the clearance between the light tube and the heat-absorbing solid body by absorbing, reflecting, or otherwise capturing light. Extending portions of this type may be used with any suitable optical arrangement around which they may be arranged.

Where the heat-absorbing solid body of the solar receiver is a rotor in the shape of a hollow cylinder, cone, frustum of a cone, or drum with one or more open ends, the one or more optical arrangements of the solar receiver may include additional solar flux optics arranged to direct the light from the optical arrangements onto the inner surface of the rotor. The additional solar optics may comprise one or more mirrors, lenses, or compound parabolic concentrators (CPCs) configured to direct the light towards the absorbing inner surface of the rotor with minimum loss of light to the surroundings or to surfaces which are not configured to transfer heat to the working fluid. Comparable arrangements may be utilized to direct solar radiation on to the inner surface of a cable or belt moving around a circuit or closed loop.

One advantageous configuration provides optical arrangements that direct all incident light, substantially all incident light, or the major proportion of incident light on to the moving heat-absorbing solid. In such a configuration, the only surfaces of the solar receiver which will be heated for eventual heat-exchange with a working fluid will be part of the moving heat-absorbing solid body. In this example, no light is directed on to stationary or immobile solids. This prevents incident light with a high c value from heating a stationary solid beyond the point of thermal tolerance. Therefore, in general, the solar receivers disclosed herein focus substantially all incident light on to the moving heat-absorbing solid body and prevent, or substantially minimize the absorption of light by stationary solid material forming the receiver. In an example, the solar receiver will be configured to only heat the moving heat-absorbing solid body via incident light. The solar receiver may be configured to prevent incident light from heating stationary solid material. For the avoidance of doubt, the term 'the major proportion' may be greater than 50%, greater than 60%, greater than 70%, greater than 80%, greater than 90%, greater than 95% or greater than 99%.

Arranged around the heat-absorbing solid body of the solar receiver are generally one or more heat exchanger cowls, configured to enable transfer of heat from the heated one or more surfaces of the heat-absorbing solid body to a working fluid passing through the cowls. The one or more cowls generally include an inlet, an outlet, and one or more fluid channels, conduits and/or chambers configured such that fluid flowing through the inlet will pass across the one or more internal or external surfaces of the heat-absorbing solid body prior to passing through the outlet. The cowl may be at least partially formed from an insulating material. Suitable insulating materials include ceramics, refractory materials, reinforced carbon materials, insulating thermally tolerant polymers, and combinations thereof. At least a portion of the cowl may be formed from alternative materials such as metals, metal oxides, plastics, polymers, etc. The inlet and outlet of the cowl may be positioned such that the direction of fluid flowing through the cowl is either in the co-current or counter-current direction relative to the direction of movement of the heat-absorbing solid body. It may be advantageous to flow the working fluid across the one or more internal or external surfaces of the heat-absorbing solid body in a counter-current direction to promote more efficient transfer of heat energy from the heat-absorbing solid body surface to the working fluid. Where a plurality of optical arrangements direct solar radiation on to more than one portion of the heat-absorbing solid body during use, a heat exchanger cowl will typically be positioned around the heat-absorbing solid body between each point at which light is directed onto the one or more surfaces of the heat-absorbing solid body. Such a configuration ensures that at least a portion of the heat energy on the surface of the heat-absorbing solid body has been transferred to the working fluid prior to further exposure of the surface to solar radiation as the heat-absorbing solid body moves. The heat exchanger cowls may be any suitable size. It may be advantageous for a dimension of the one or more fluid channels to be equivalent to one or more dimensions of the one or more absorbing surfaces of the heat-absorbing solid body. Where the height or length of the one or more fluid channels closely matches the one or more surfaces of the heat-absorbing solid body, improved transfer of heat from the heat-absorbing solid body to the working fluid may be achieved. Moreover, such a configuration may reduce the loss of heat from the heat-absorbing solid body into the ambient surroundings of the receiver. In some cases, it may be advantageous to form at least a portion of the heat exchanger cowl and/or heat-absorbing solid body from a porous material. It may also be advantageous to provide one or more impingement holes on one or more surfaces of the cowl in proximity to the surfaces of the heat-absorbing solid body, or upon one or more surfaces of the heat-absorbing solid body itself, which are not utilized to receive solar radiation to allow additional cooling of the heat-absorbing solid body in use. Where the heat-absorbing solid body is hollow, the cowls may be configured to allow working fluid to flow in to an inlet of the heat-absorbing solid body and out through an outlet. In these examples, the cowl will be in fluid communication with the inlet of the heat-absorbing solid body, the outlet of the heat-absorbing solid body, or both the inlet and the outlet of the heat-absorbing solid body as required. In some examples, the heat exchange cowl may be integrated into a hollow heat-absorbing solid body such that the portions of the cowl which had previously been positioned around the heat-absorbing solid body are functionally replaced by the internal fluid conduits, passages or cavities on the inside of the hollow heat-absorbing solid body. In such examples, a portion of the heat exchange cowls and/or their associated systems will be arranged at the inlet and outlet positions at which working fluid flows into, and out of, the hollow heat-absorbing solid body.

To further reduce loss of energy, the solar receiver may further include one or more scavenger or collection ducts to minimize heat loss from the edges of the heat exchanger cowls. In operation, the air in and around the solar receiver may become heated. Any residual or lost hot air may be recovered through such ducts for recovery and utilisation of otherwise waste heat. Scavenger or collection ducts may impart the additional benefit of cooling components of the solar receiver with a lower thermal tolerance than the surface of the heat-absorbing solid body upon which solar radiation is incident.

The working fluid flowing through the heat exchanger cowls will generally be in the form of a liquid or a gas. Desirable working fluids will exhibit sufficient heat capacity and heat transfer properties to allow a large proportion of the heat energy on the surface of the heat-absorbing solid body to be transferred to, and carried away by, the working fluid flowing through the heat exchanger cowl. Air may be the preferred working fluid due to the balance between its thermal characteristics, ease of availability, low cost and the absence of the requirement to maintain a closed circuit flow. However, air may be unsuitable for some configurations of solar receiver where materials are sensitive to oxidative degradation or reaction with water. Alternative working fluids may impart improved heat transfer or other advantages as desired. Examples of suitable working fluids include air, steam, helium, carbon dioxide, etc. It may be particularly advantageous to utilize particular working fluids depending on the configuration of the wider system in which the solar receiver is housed. For example, a carbon dioxide working fluid would allow the heated fluid to be passed to a supercritical $CO_2$ Brayton turbine without significant additional modifications. The working fluid may flow in a closed, or open circuit as desired.

The solar receiver may also comprise a control system, and one or more sensors communicably coupled to the control system. It may be desirable to measure the light incident upon the receiver and/or the temperature of one or more components of the receiver such that operation of the receiver can be adjusted to ensure efficient and optimal operating conditions. For example, a temperature sensor may be positioned in proximity to, or embedded in, the heat-absorbing solid body component. If the temperature of the heat-absorbing solid body breaches a pre-determined level, the movement speed of the heat-absorbing solid body may be increased or, alternatively, one of a plurality of optical arrangements, if present, may be deactivated to reduce the solar radiation incident upon the heat-absorbing solid body. Similarly, one or more light sensors may be positioned in or around the optical arrangements and/or heat-absorbing solid body. When an increase in incident light is detected, the control system may cause the speed of movement of the heat-absorbing solid body to increase to prevent excessive temperatures being reached on the one or more absorbing surfaces of the heat-absorbing solid body. When a sensor detects a decrease in the concentration of incident light, the movement speed of the heat-absorbing solid body may be slowed by the control system, as required. The control system may additionally, or alternatively, adjust the speed of movement of the heat-absorbing solid body in response to weather data provided by one or more weather forecasting providers.

According to another aspect of the invention, there is provided a concentrated solar power station including one or more mirrors, lenses, heliostats and/or reflectors; and a receiving mast comprising a solar receiver as previously described. The receiving mast may include additional solar optics configured to direct the light directed towards the mast from the one or more heliostats to the one or more optical arrangements of the solar receiver.

In operation, the heliostats direct light towards the receiving mast from where the light is directed to heat the heat-absorbing solid body of the solar receiver. The heliostats may be configured to rotate and/or adjust their angle and orientation relative to the position of the sun to ensure that incident light is directed towards the receiving mast throughout the course of a day. The heated working fluid from the solar receiver may then be directed towards a further heat exchange system or other system where the heat may be used in a generation system configured to convert heat energy from the working fluid into electrical energy. The generation system may be selected depending upon the working fluid flowing through the solar receiver. For example, a Rankine turbine generator may be most suitable where steam is the working fluid. A Brayton generator may be most suitable where carbon dioxide is the working fluid. Alternatively, or additionally, the hot working fluid may be directed to alternative systems such as kilns, reactors or heating devices that can directly utilize the heated fluid. The surface area of the one or more heliostat systems relative to the surface area upon which the heliostats focus the incident light determines the light concentration factor, c. The receiving mast comprising the solar receiver of the present invention may be capable of receiving light at a concentration factor of up to at least 10,000. Without being bound by theory, the solar receiver of the present invention may be capable of receiving light at a concentration factor of up to at least 20,000. It may be possible to utilize the heated working fluid directly from the solar receiver to directly generate electricity without an additional heat exchange step.

In practice, the position of the sun will change with time relative to the power station's mast and heliostats. The control system of the solar receiver as previously described may be configured to adjust the angle of the heat-absorbing solid body, cowls and/or optical arrangements of the solar receiver depending upon the direction of incident sunlight. In this manner, the control system may determine the position of the sun via the one or more sensors and automatically adjust the angle of one or more components of the solar receiver to compensate for a change in incident light angle due to movement of the sun and/or the power station's heliostats.

The concentrated solar power station may include a means of storing energy. The capability to store and later release energy allows the power station to continue providing electrical energy during periods of low incident solar radiation, such as the night time. Examples of energy storage media include electrical energy stored directly in batteries or capacitors, insulated heat storage, gravity batteries, chemical storage techniques, or any other suitable storage method.

According to another aspect of the invention, there is provided a method for converting light into electrical energy, including the steps of: (i) heating a solid by shining light onto the solid, (ii) moving the solid material, (iii) exchanging heat between the solid and a working fluid, and (iv) converting the heat energy of the working fluid into electrical energy. The solid may be a single article, entity or component. The solid may not be a granular material, fluid, or flowable particulate, such as sand.

In principle, the present invention allows a higher light concentration value c to be used in conjunction with a solar power system. A stationary or immobile solid receiver will rapidly reach high temperatures when exposed to elevated values of c. By moving the solid material at speed such that it is heated and cooled in rapid succession, the material may be prevented from reaching a temperature that would cause the solid material to fail. In this manner, high light concentration values may be used as, due to the movement speed of the heat-absorbing solid body, the surface is only intermittently exposed to the focused solar radiation. In particular, the invention enables the receiver of the solar thermal power station to operate at higher values of the light concentration factor, c.

As will be apparent to a practitioner of the art with the benefit of this disclosure, the heat-absorbing solid body, receiver, power station and method of the present invention overcome many of the other drawbacks and problems associated with known receivers. In particular, the present invention may improve the lifespan of the solar receiver when compared to many known systems. Furthermore, the heat-absorbing solid body removes the need to store and transport large quantities of hot material such as molten salts or flowable particulates for the generation of electrical energy. The absence of large quantities of hot material may thus impart safety benefits upon the concentrated solar power stations where the invention is applied. Use of the receiver of the present invention further removes the need to consume energy to pump, transport, and/or elevate materials from the base of a receiving tower or mast to an elevated position. Moreover, only a small area of the receiving mast or solar tower need be capable of withstanding the high temperatures of the receiving medium. In contrast to many known systems where large sections of the system are exposed to high temperatures, only the solar receiver of the present invention need possess a high thermal tolerance. Limiting the thermal stresses to smaller areas of the receiving mast or tower may allow cheaper or more readily available materials to be employed in the construction of the solar tower.

BRIEF DESCRIPTION OF THE DRAWINGS

Embodiments of the present invention will now be described with reference to the following drawings, in which.

DESCRIPTION

The following examples present various aspects of the present invention and means of implementing the same. The examples provided are merely exemplary solar receivers and are not intended to limit the scope of the invention.

Figure 1:
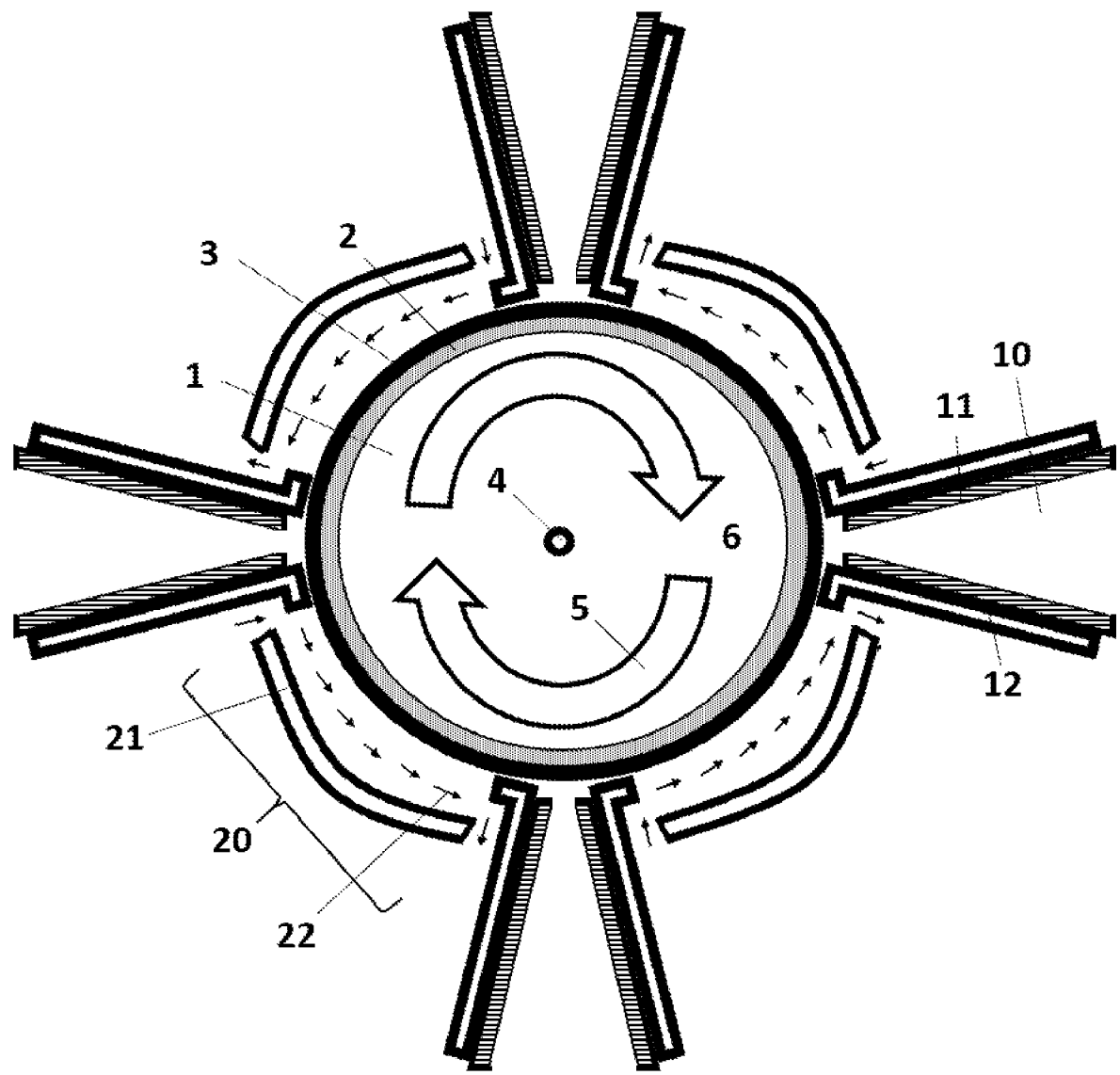
FIG. 1 is a top down view of a solar receiver within the scope of the present invention.

FIG. 1 shows a top down view of a solar receiver within the scope of the present invention. The solar receiver 100 includes a substantially cylindrical rotor 1. The rotor includes a substantially cylindrical central rotor body 6 which includes a central axle 4 running through the centre of the cylinder's circular flat surfaces. The central axle 4 allows the rotor to rotate around a central pivot point. The rotor includes a layer of insulating material 2 that covers the curved face of the cylindrical rotor body, and a coating 3. The coating includes any suitable material with a high solar absorbance, high refractive index and a high thermal tolerance (i.e. melting point). In exemplary embodiments, the coating includes a material that approximates a black body.

Figure 2:
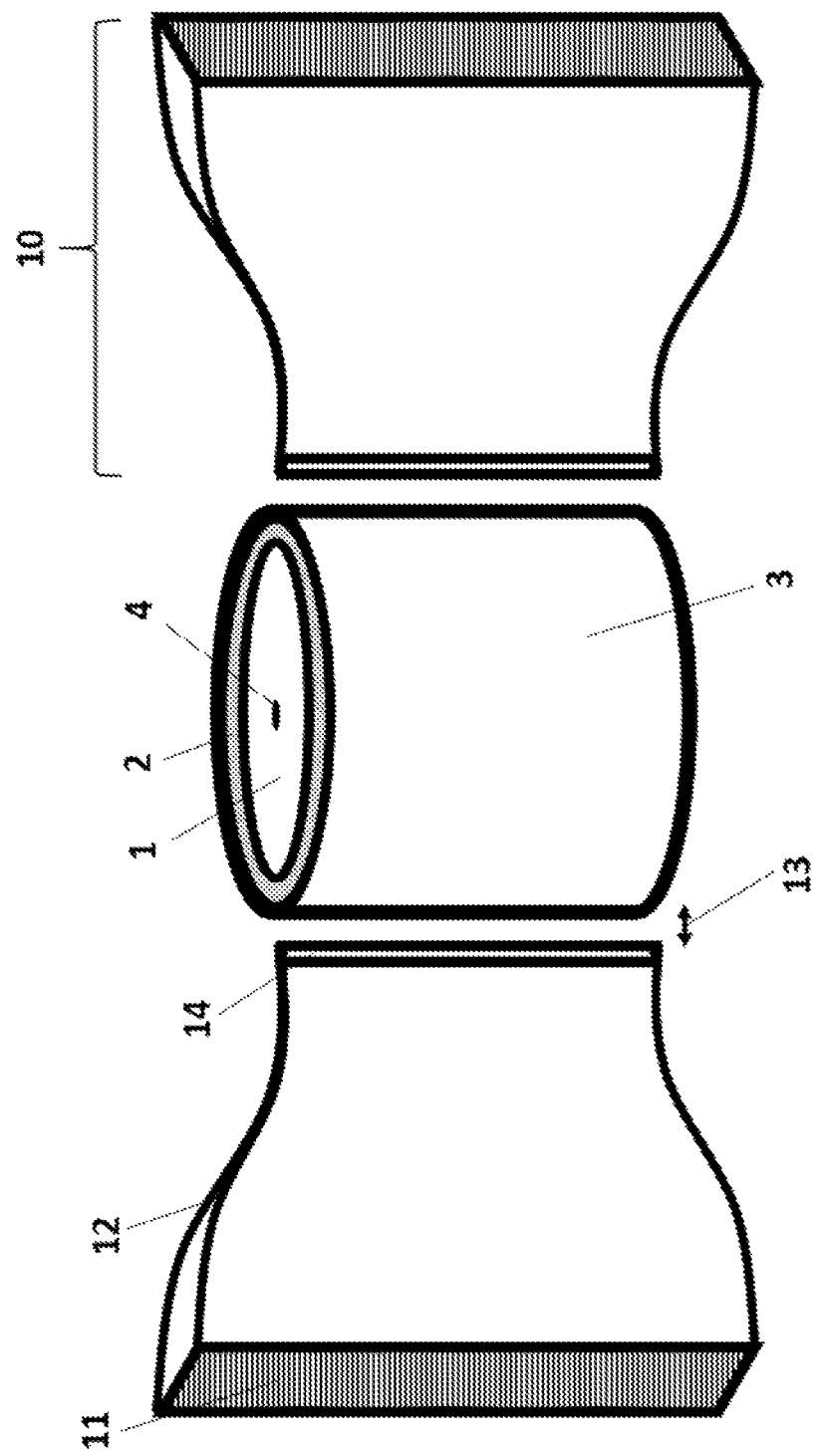
FIG. 2 is a side view of the solar receiver of FIG. 1 omitting the cowling and two of the light tubes.

Positioned at 90° intervals around the rotor cylinder are four light tubes 10 configured to direct light onto the coating 3 on the curved face of the cylindrical rotor. Each light tube 10 includes an outer casing 12 containing reflective mirror surfaces 11. The casing 12 narrows as it approaches the rotor 1 and arrives at an end aperture 14 at its narrowest point, the aperture facing the coated rotor surface 3. The shape of the casing 12 and the reflective mirror surfaces 11 are configured to direct light through the light tube 10 towards the end aperture 14 of the light tube 10 and onto the coated surface 3 of the rotor 1. As shown in FIG. 2, the clearance 13 between the end of each light tube 10 and the coated surface 3 of the rotor 1 is minimized to reduce leakage or loss of energy as the light leaves the light tube 10. The rotor 1 and the light tubes 10 are not in direct contact to prevent damage to the rotor 1 and/or light tubes 10 when the rotor 1 rotates. The ends of the casing 10 comprise extending portions 15 that extend away from the end aperture 14 approximately parallel to the curved coated surface 3 of the rotor 1. The extending portions further reduce the leakage or loss of energy from the solar receiver 100 by further reducing the spatial area through which light may leave the area between the light tube 10 and the rotor 1. The end aperture 14 of each light tube 10 is rectangular in cross section with a length 16 equivalent to the height 7 of the rotor. The end aperture 14 of each light tube 10 is positioned such that light leaving the light tube 10 will be substantially perpendicular to the portion of the coated surface 3 of the rotor 1 faced by the end aperture 14.

Figure 3:
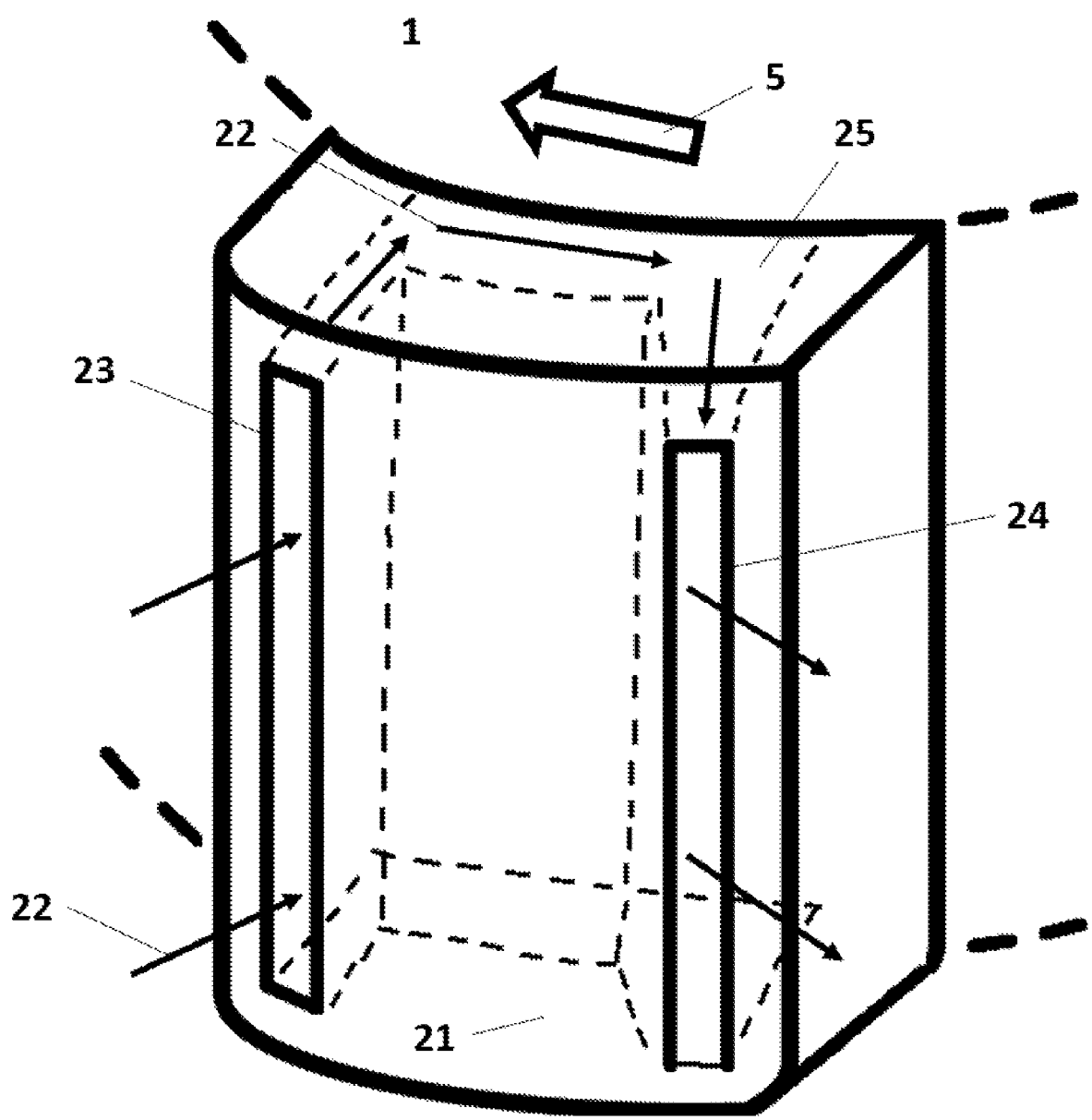
FIG. 3 is schematic representation of the heat exchanger cowl of FIG. 1.

Returning to FIG. 1, four heat exchanger cowls 20 are arranged around the rotor 1 between each of the four light tubes 10. A schematic representation of one such cowl is shown in FIG. 3. The cowl 20 is shaped such that the edges of the cowl in closest proximity to the rotor 1 are contoured to conform to the curvature of the rotor 1. The cowl 20 is primarily formed from an insulating material and comprises an inlet 23 and an outlet 24 connected by a flow passage 25 that extends through the cowl. A portion of one of the walls of the flow passage 25 is substantially formed by the coated surface 3 of the rotor 1 against which the cowl 20 is positioned. In operation, air flows through the flow passage 25 of the heat exchanger cowl 20 from the inlet 24 to the outlet 25 in a direction 22 that is counter-current to the direction of rotation 5 of the rotor 1. The air entering the cowl via the inlet is at a lower temperature than the rotor 1 and therefore promoted transfer of heat from the coated surface 3 of the rotor 1 to the flow of working fluid air.

In operation, light incident on the solar receiver 100 is directed towards the rotor 1 via the light tubes 10. The light is absorbed by the coated surface 3 of the rotor and is thereby converted to thermal energy. The thermal energy is then carried around the circumference of the rotor 1 via rotation, and transferred to the air flowing through the heat exchanger cowls positioned around the rotor. As previously described, the light tubes may be accompanied by one or more mirrors, lenses, prisms or alterative optical component that allows light from one or more heliostats to reach the light tubes and thus the rotor of the solar receiver. In some embodiments, the light tubes may be entirely absent in favour of alternative optical arrangements.

Figure 4:
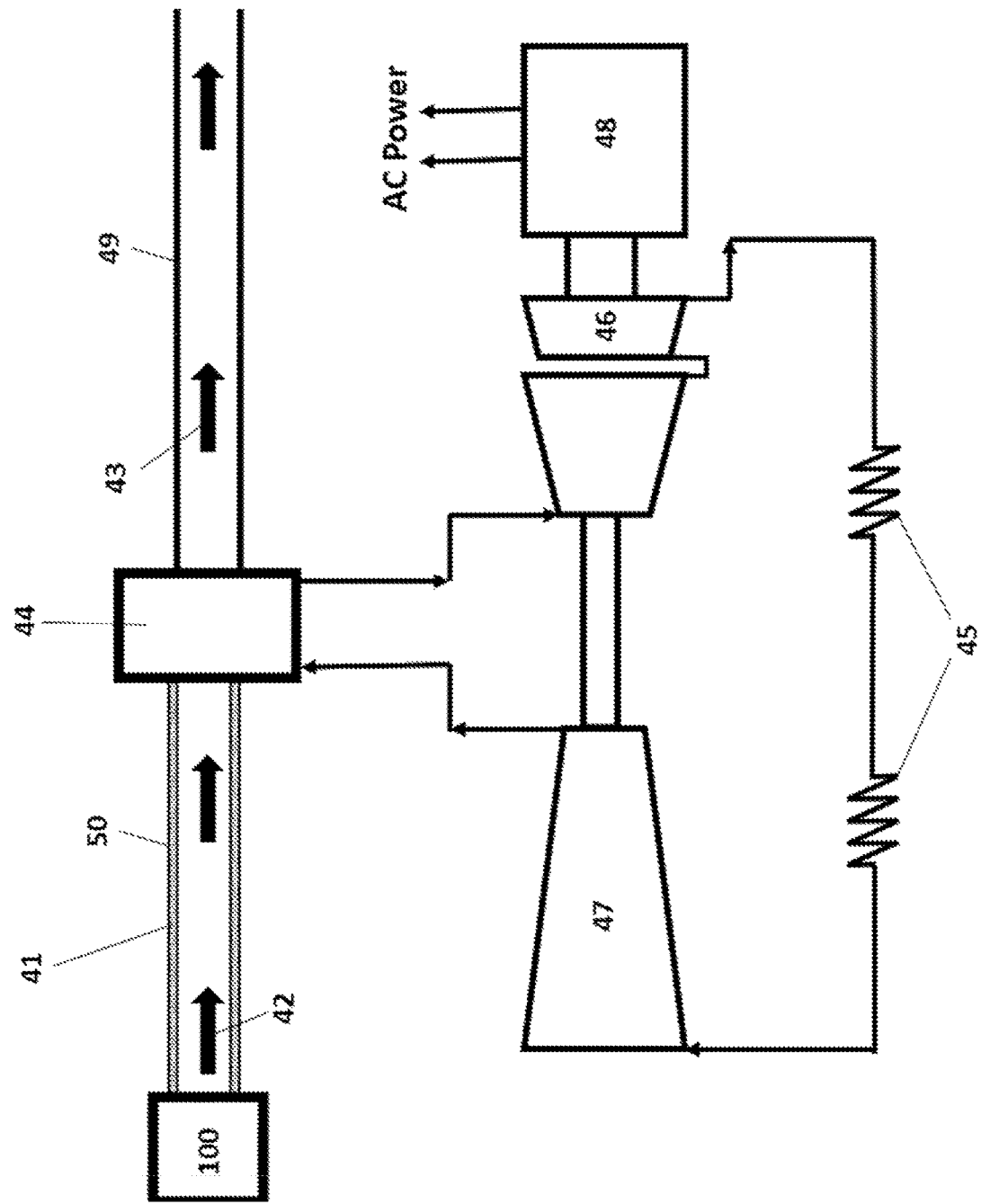
FIG. 4 is a representation of an electricity generation system that may be used in conjunction with a solar receiver of the present invention.

FIG. 4 shows one way through which the solar receiver 100 of FIG. 1 may be utilized to generate electrical energy. In the system of FIG. 4, the hot working fluid air 42 leaving the outlets 24 of the heat exchanger cowls 20 of solar receiver 100 is carried through an insulated pipe 50 lined with insulating material 41. The hot air is passed through a conventional plate heat exchanger 44. The exhaust air 43 leaving the plate heat exchanger 44 via exhaust pipe 49 is returned to the heat exchanger cowls 20 of the solar receiver 100 for additional energy collection. The hot steam produced in the plate heat exchanger 44 is then passed to a Rankine turbine systems including a turbine 46 and associated generator 48 which generates electrical energy. The hot gases leaving the turbine 46 are then passed through several supplementary heat exchangers 45 before entering condenser 47 and being returned to the plate heat exchanger 44 as cool air/steam. Although FIG. 4 is described with reference to the solar receiver of FIG. 1, the system of FIG. 4 may be used with any solar receiver within the scope of the invention that gives rise to a heated working fluid during operation.

Figure 5:
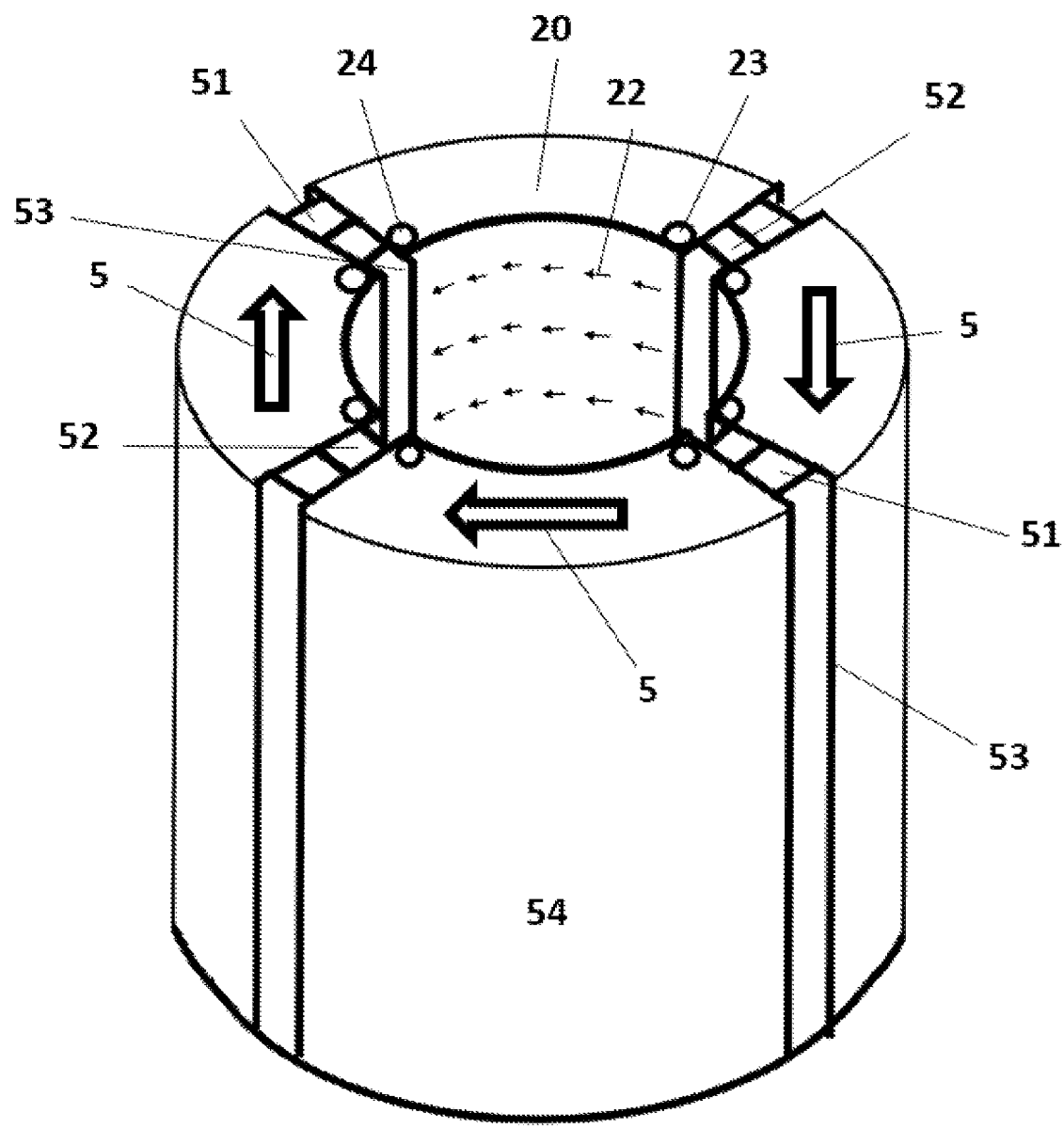
FIG. 5 is a representation of an alternative solar receiver with a hollow cylindrical drum configuration.

FIG. 5 shows an angled top-down representation of an alterative example of a solar receiver with a hollow cylindrical drum configuration. Hollow cylindrical rotor 51 is housed inside a series of four heat exchanger cowls 20 positioned at 90° intervals around the rotor cylinder. Between each heat exchanger cowl is a slot 53 which exposes a surface of the rotor 51. The inner surface of the rotor 51 is coated with a layer of coating 52. In operation, solar radiation is focused upon one or more surfaces of the rotor coating 52 exposed by the one or more slots 53 between the heat exchanger cowls 20. One or more optical arrangements (not shown) are configured to direct and concentrate solar radiation onto the exposed rotor surface on the inside of the hollow cylinder. The rotor 51 and coating 52 rotate in a direction 5 which allows the inner coated surface of the rotor to become exposed to the incident solar radiation over the course of one 360° rotation event. Heat exchanger cowl 20 is stationary during use. Working fluid flows into one or more of the heat exchanger cowls 20 through an inlet 23 and passes over the heated rotor coating surface 52 in a counter-current direction 22. The heated working fluid then leaves the heat exchanger cowl 20 via outlet 24 and is passed to an electrical generation means such as that shown in FIG. 4 and/or to an alternative system desirous of heat energy. The outer surface 54 of the one or more heat exchanger cowls may include one or more impingement holes to allow cooling of the uncoated side of the rotor during use.

The hollow cylinder system of FIG. 5 may be adapted for use in place of the rotor shown in FIG. 1. In this alternative example (not shown), the rotor coating may instead be positioned on the outside surface of the hollow cylindrical rotor and one or more optical arrangements and/or light tubes may be used to direct solar radiation onto the coated outer surface of the rotor. The position of the working fluid inlet, outlet and flows passages would, in this alternative example, be positioned in the portion of the heat exchanger cowls proximal to the coated rotor surface to allow heat exchange to occur.

Figure 6:
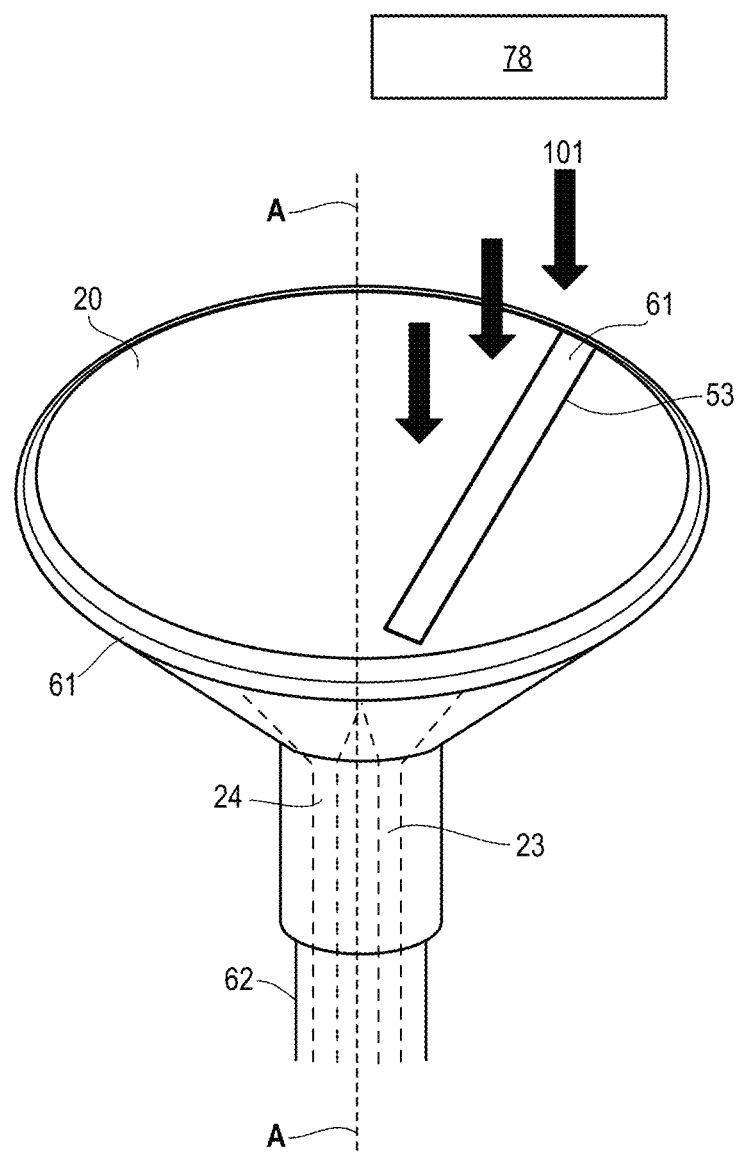
FIG. 6 is a representation of an alternative solar receiver with a conical shape.

FIG. 6 shows a further configuration of a solar receiver within the scope of the present invention. The solar receiver of FIG. 6 is frustoconical, or substantially conical, in shape and defines an inner surface that is a truncated cone, wherein one of ordinary skill in the art would understand that the truncated cone of FIG. 6 regards a cone section lacking an apex and terminating in a plane parallel to the base. The receiver includes a heat exchanger cowl 20, a shaft 62, a rotor 61, slot 53, inlet 23 and outlet 24. The rotor 61 and cowl 20 are positioned on and around shaft 62, configured such at least rotor 61 may rotate freely around the shaft 62. At least one portion of cowl 20 is absent to form slot 53 which exposes one or more surfaces of the rotor 61 beneath. In operation, solar radiation 101 is focused towards the exposed portion of the rotor 61 within the slot 53 by a light focuser 78 as shown schematically in FIGS. 6 and 7. Light focuser 78 is shown schematically in FIGS. 6 and 7 and is not to be construed to denote a particular size or orientation for the light focuser. The exposed portion of the inner surface of the rotor 61 absorbs the solar radiation 101 and stores it as heat energy. The frustoconical shape of the receiver allows light to be more easily directed towards the inner surface of the rotor. The rotor 61 rotates via bearing arrangements 63, the rotation driven by a motor and drive belt arrangement (not shown) that cause rotor 61 to rotate while the heat exchanger cowl 20 remains stationary. During an instant of time of rotation of the rotor 61, an exposed portion of the inner surface of the rotor 61 that is located below the slot 53 is exposed to the solar radiation 101 while the remaining portions of the inner surface are not so exposed. Further rotation of the rotor 61 and the inner surface of the rotor 61 results in another portion of the inner surface of the rotor 61 adjacent to the exposed portion being exposed to the solar radiation 101, wherein the previously mentioned exposed portion is rotated beyond the slot 53 so not to be exposed to the solar radiation 101. The above process continues for at least one revolution of the rotor 61 and the inner surface of the rotor 61. After one rotation of the rotor 61, a continuous portion of the entire surface of the inner surface has been exposed to the solar radiation 101 at some time during one revolution of the rotor 61, wherein the continuous portion completely surrounds a portion of a rotation axis A of the rotor 61. Cowl 20 is affixed to shaft 62 by any suitable fixing means such as screws or bolts. Working fluid enters the heat exchanger cowl 20 via inlet 23 inside the shaft 62. The working fluid circulates around the heat exchanger cowl 20 across the surface of the rotor 61 before leaving the solar receiver via outlet 24 positioned internal to the shaft 62. The cowl 20 and/or rotor 61 may be at least partially lined with insulating or refractory material. The heat exchanger cowl may further include one or more sealing lips to prevent loss of working fluid through residual gaps formed between the rotor 61 and cowl 20. An additional sealing lip may also be present at the base of the cone/bowl arrangement in proximity to the shaft 62 to prevent further loss of heat.

Figure 7:
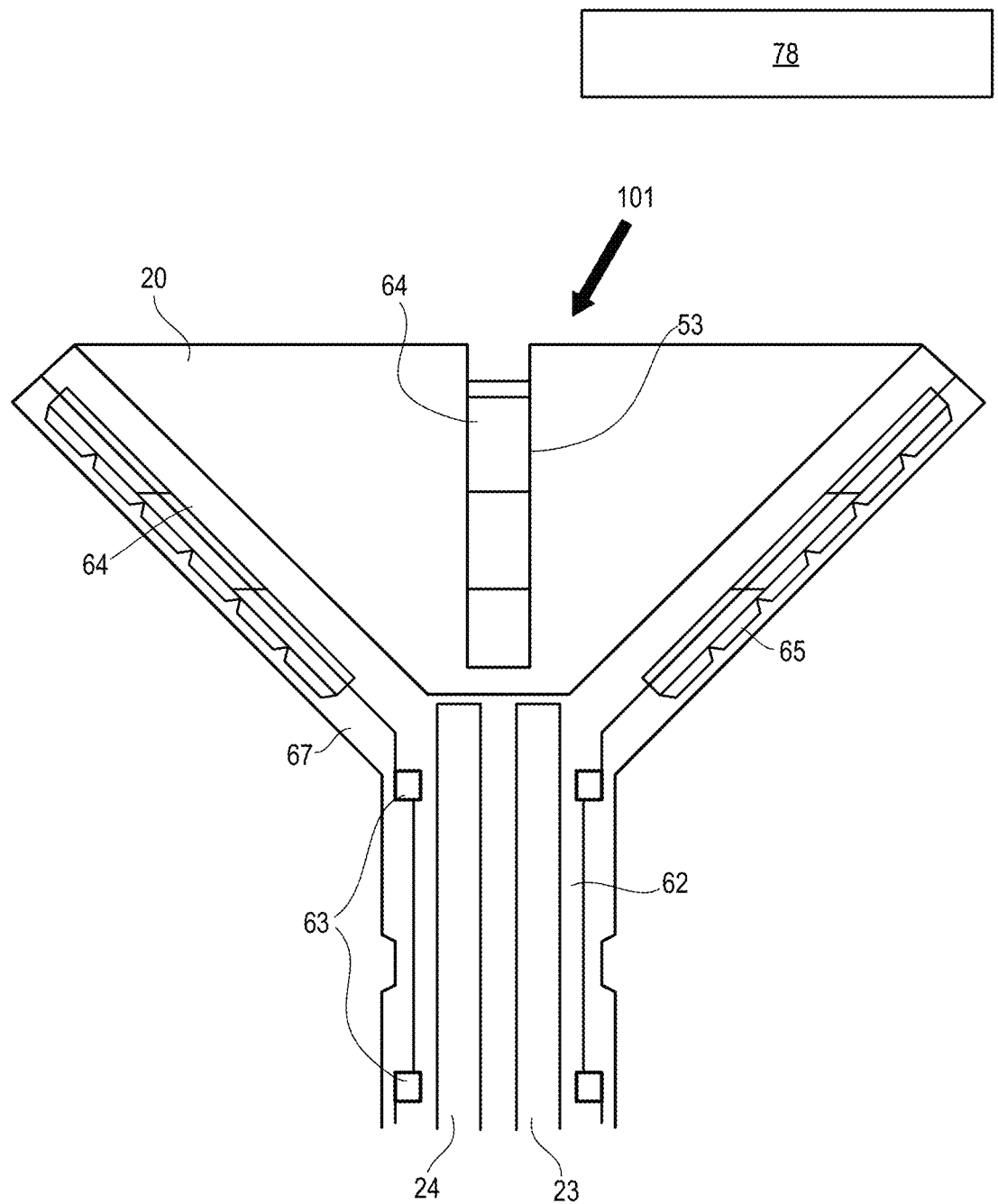
FIG. 7 is a cross-sectional view of a solar receiver of the design of FIG. 6.

FIG. 7 shows a cross section of a solar receiver conforming to the design of FIG. 6. The rotor of FIG. 7 includes a rotor body 67 upon which is seated absorptive tiles 64 and impingement heat shield plates 65. In operation, the absorptive tiles 64 are exposed to solar radiation through slot 53. The solar tiles 64 absorb the solar radiation as heat energy prior to its transfer to the working fluid flowing from the inlet 23 to the outlet 24. The absorptive tiles 64 may be formed from refractory material or any absorptive material previously described as suitable for a rotor or rotor coating. The absorptive tiles 64 rest upon impingement heat shield plates 65 which are configured to both protect the rotor body 67 from exposure to excessive heat and to allow the passage of air to cool the rotor body 67 and/or absorptive tiles 64. Although FIG. 7 shows a plurality of absorptive tiles 64 and a plurality of impingement heat shield plates 65, it is envisaged that either or both the absorptive tiles 64 and the impingement heat shield plates 65 may be present in the form of a single article around the inner surface of the rotor body 67 or alternatively in segmented form as shown. Additional insulating and/or refractory material (not shown) may be present between the absorptive tiles 64, impingement heat shield plates 65 and/or rotor body 67 as required.

Figure 8A:
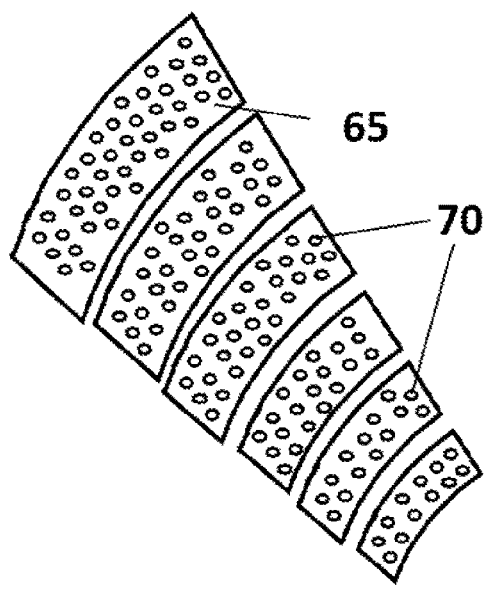
FIGS. 8A to 8E are representations of components of a solar receiver for use with the receiver according to FIG. 6 and/or FIG. 7.
Figure 8B:
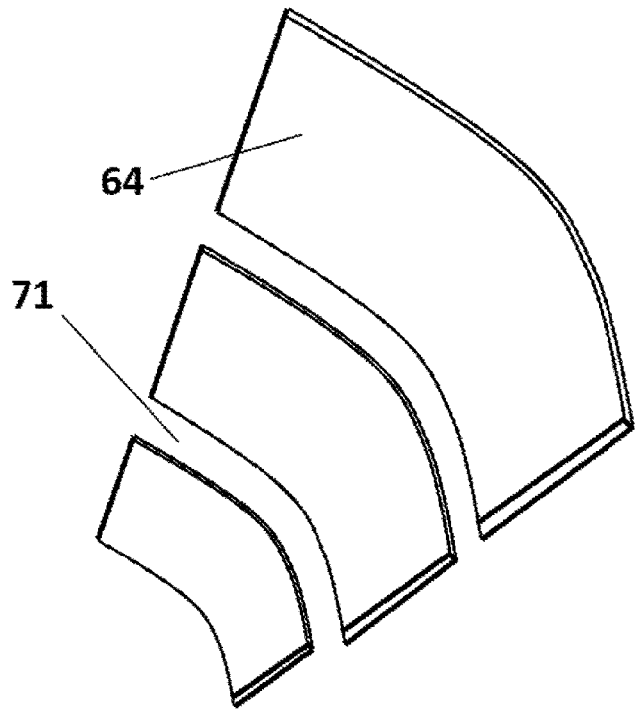

With additional reference to FIG. 8A, impingement heat shield plates 65 have one or more impingements holes 70 therethrough. The impingement holes 70 allow the passage of cooling air or other fluid through the impingement heat shield plates to facilitate the cooling or temperature regulation of the rotor body 67 and/or absorptive tiles 64. Where a plurality of impingement holes 70 are present, the holes may be arranged in any suitable pattern or orientation. The impingement holes may be positioned or angled to guide the flow of air along a particular path, or across specific portions of the solar receiver, as desired. FIG. 8B shows a representation of absorptive tiles 64. The tiles 64 are designed to be interlocking when arranged upon the rotor body 67. In practice, a compliance gap 71 may be provided between tiles to account for thermal expansion, manufacturing defects, etc.

Figure 8C:
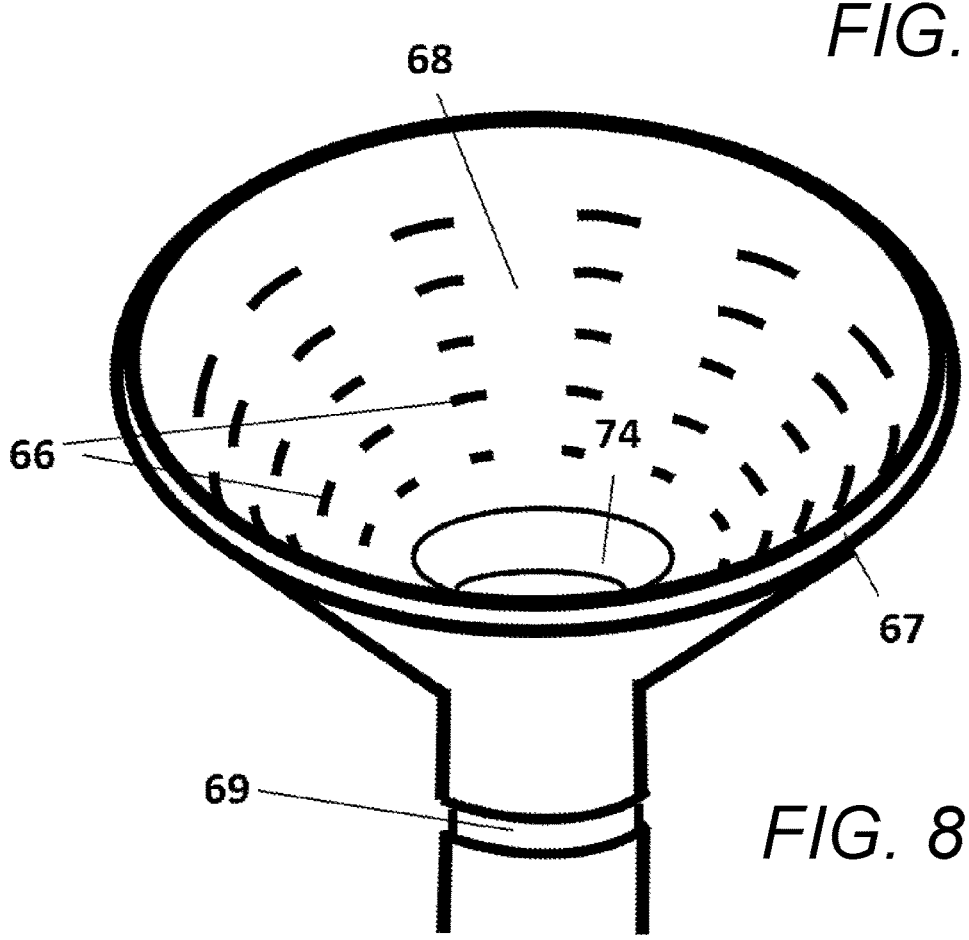

FIG. 8C shows the rotor body 67 of the rotor 61 in isolation. The rotor body 67 includes one or more support ribs 66 that extend outward from the inner surface of the rotor body 67. The impingement heat shield plates 65 and absorptive tiles 67 rest upon the support ribs 66 to provide a 'cooling gallery' void space 68 between the rotor body 67 and tiles/plates (64, 65). When the absorptive tiles are at least partially formed from a porous material, the working fluid may be passed through the absorptive tiles to the cooling gallery from where it may be further directed to the outlet 24. The rotor body 67 may further include radiative elements (not shown) such as fins to facilitate transfer of heat to the working fluid. Optionally, the support ribs 66 may be configured to function as radiative elements. To facilitate rotation, the rotor body 67 includes a drive belt groove 69 to allow a motor and drive belt (not shown) to rotate the rotor 61 as required.

Figure 8D:
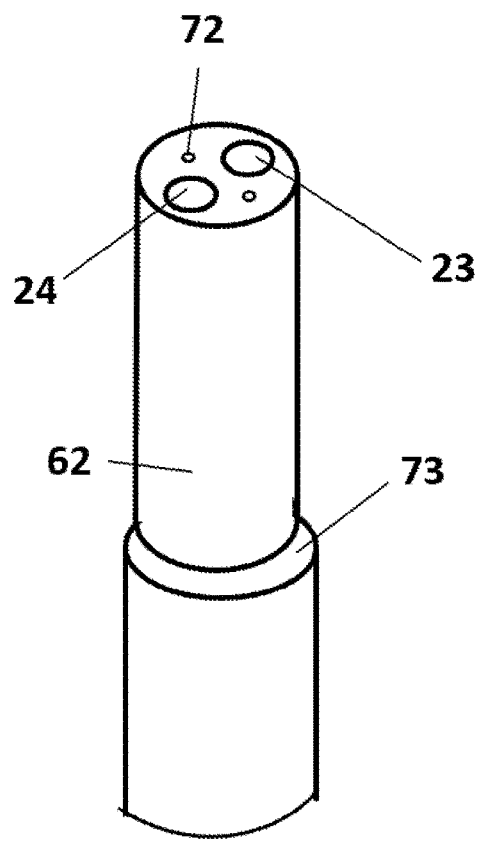
Figure 8E:
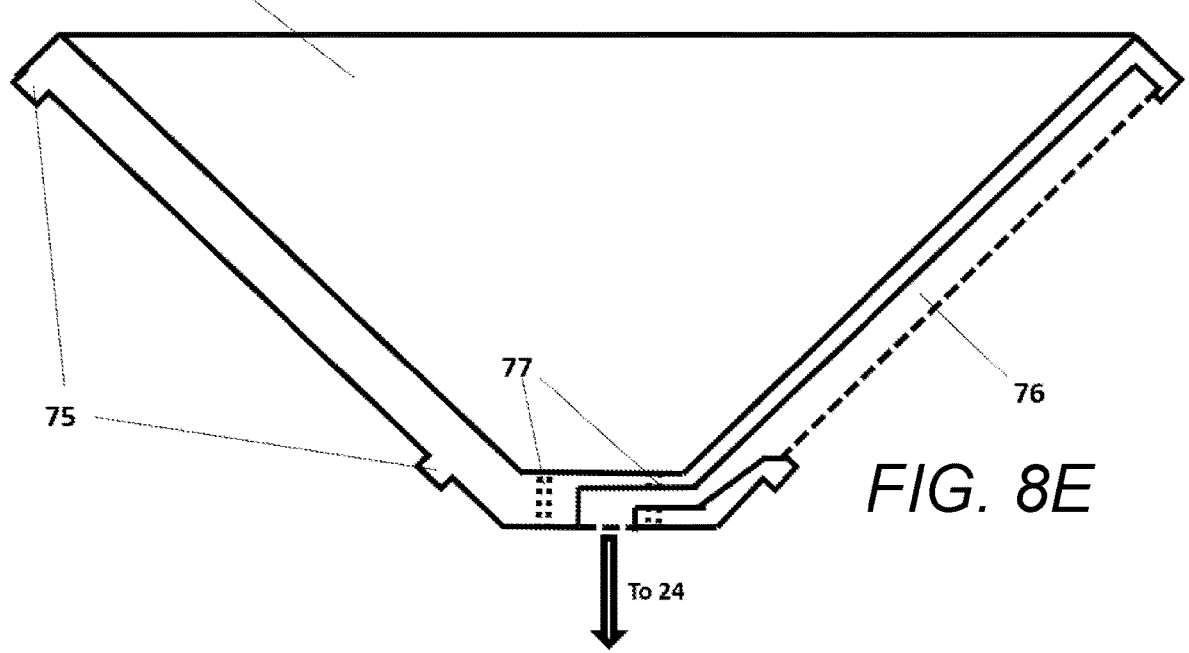

FIG. 8D shows a schematic of shaft component 62. In operation, rotor body 67 sits atop shaft 62, supported at least in part upon support lip 73. The inlet 23, outlet 24 and fixing points 72 are exposed through the centre gap 74 of the rotor body 67 to allow fixing of the cowl 20 to the shaft. FIG. 8E shows a cross section of the cowl 20 across inlet 24. Passages 77 are shown in the cowl 20 to allow screws or bolts to interact with fixing points 72 on the shaft. When affixed to the shaft 62, the inlet and outlet working fluid channels of the cowl 20 will align with the inlet 23 and outlet 24 of the shaft to allow working fluid to flow across the surface of the rotor 61. One or more voids 76 in the cowl 20 allow passage of working fluid from the inlet 23 to the rotor and ultimately from the rotor to the outlet 24. In the examples shown, the inlet and outlet passages are positioned either side of the cowl slot 53. Sealing lips 75 prevent the escape of hot air from between the rotor 61 and the cowl 20.

Figure 9:
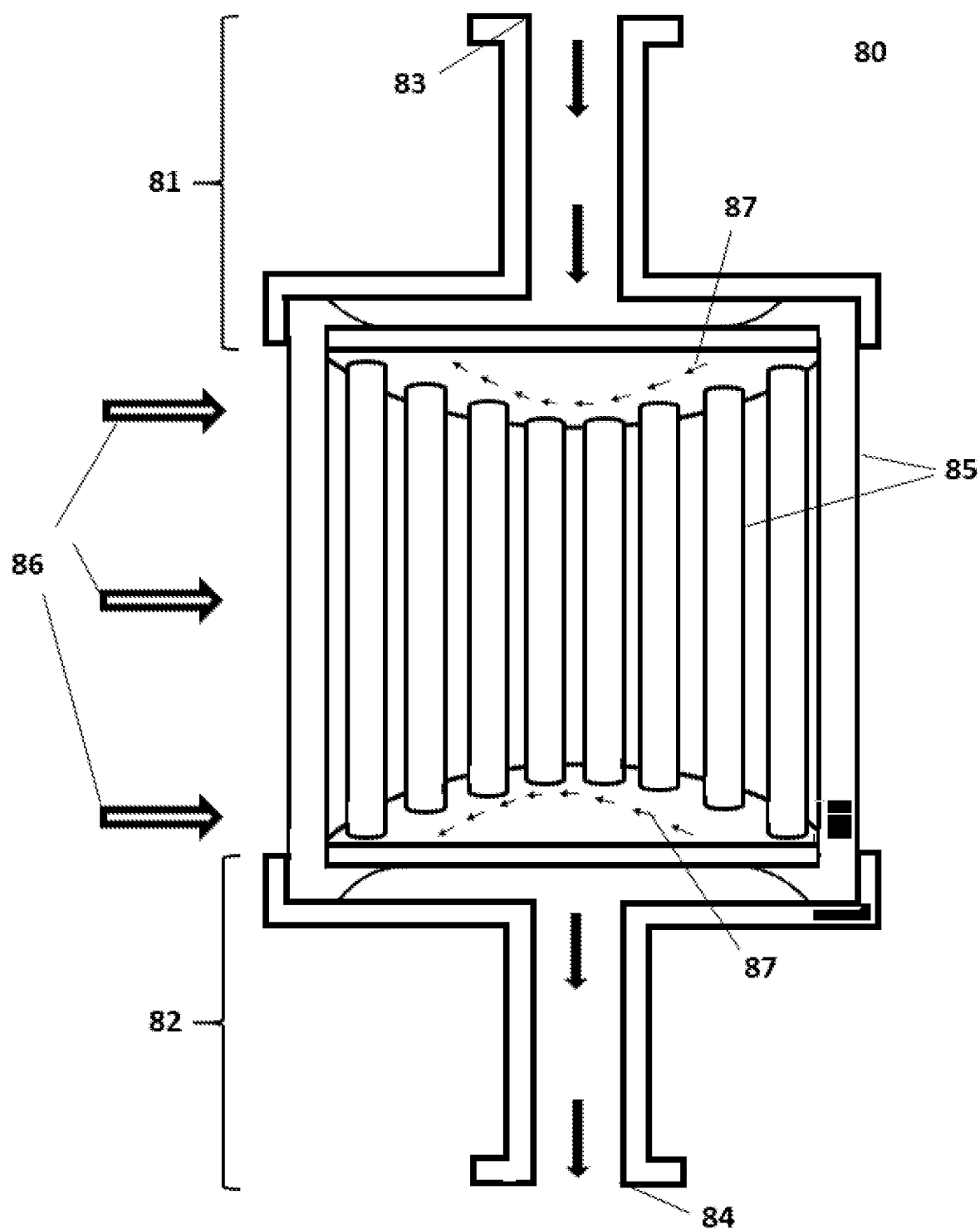
FIG. 9 is a cross-sectional schematic representation of a hollow rotor that may be used with the solar receivers described herein.

The solar receivers of the present invention may utilize any suitable rotor design suffice that light may be directed to one or more surfaces of the rotor such that the rotor becomes heated, and that the rotor may move or rotate such that the heated portion of the rotor may be cooled by exchanging heat between the rotor surface and a suitable working fluid. Consequently, many alternative rotor designs are envisaged. FIG. 9 shows a cross-sectional schematic representation of a hollow rotor 80 that may be used with the solar receivers described herein. The rotor 80 is formed from two body portions 81, 82 which are substantially discoidal in shape. The body portions 81, 82 are substantially hollow such that working fluid may flow into the first body portion 81 via inlet 83 in the first body portion and out of outlet 84 in the second body portion 82. Positioned between the first body portion 81 and the second body portion 82 are a plurality of conduits 85. The conduits may be any suitable shape including, but not limited to square or rectangular in cross section, tubular with a circular or oval cross section, or more complex cross sectional shapes as desired. The conduits are arranged around the outer circumferential periphery of the circular faces of the discoidal body portions 81, 82, such that the conduits 85 connect the first body portion 81 to the second body portion 82. The resulting configuration approximates the shape of a cylindrical cage with the inlet 83 and the outlet 84 extending out from the respective first and second body portions 82, 83 on the opposite side of each body portion from the side to which the conduits 85 are connected. The conduits 85 are substantially hollow and are in fluid communication with the hollow region of each of the first and second body portions 81, 82. In use, working fluid may therefore flow into the rotor via the inlet 83 into the hollow part of the first body portion 81, through the plurality of conduits 85 into the hollow part of the second body portion 82 and then out through the outlet 84. Solar radiation 86 may be directed towards the surface of one or more of the plurality of conduits 85. In an example, the solar radiation may pass through a slot (not shown) such that the light incident upon the rotor 80 is directed towards a surface area equivalent to, or less than, the surface area of one side of a single conduit 85. Solar radiation 86 incident upon the surface of a conduit 85 will cause the surface of the conduit to become heated. In use, rotor 80 rotates in a direction 87 such that each of the plurality of conduits 85 will becomes exposed to the solar radiation, and thus heated, in turn. Working fluid is passed through the rotor 80 and over the heated internal surfaces of the plurality of conduits 85 such that heat is transferred from the rotor surfaces to the working fluid cooling the rotor and heating the working fluid. Once cooled, each of the plurality of conduits 85 will eventually be carried back to a position at which it is subjected to further heating via the incident solar radiation 86 due to the rotational movement of the rotor 80. The conduits may be positioned in any suitable arrangement. In an example, the conduits may be positioned such that when the rotor is rotating and the incident solar radiation would pass between two conduits on the near side of the rotor, a further conduit will be exposed to the solar radiation on the far side of the rotor due to the light passing through the gap between the two conduits nearest the source of the solar radiation. In this manner, incident solar radiation will be unable to pass through the entirety of the rotor without contacting at least one conduit. Additional conduits may be positioned away from the circumferential periphery of the discoidal rotor bodies and proximate to the centre of the circular surfaces of the bodies as desired. In other examples, solar radiation may be directed towards the rotor 80 from multiple directions via any suitable means such as those shown in the solar receiver of FIG. 1.

Figure 10:
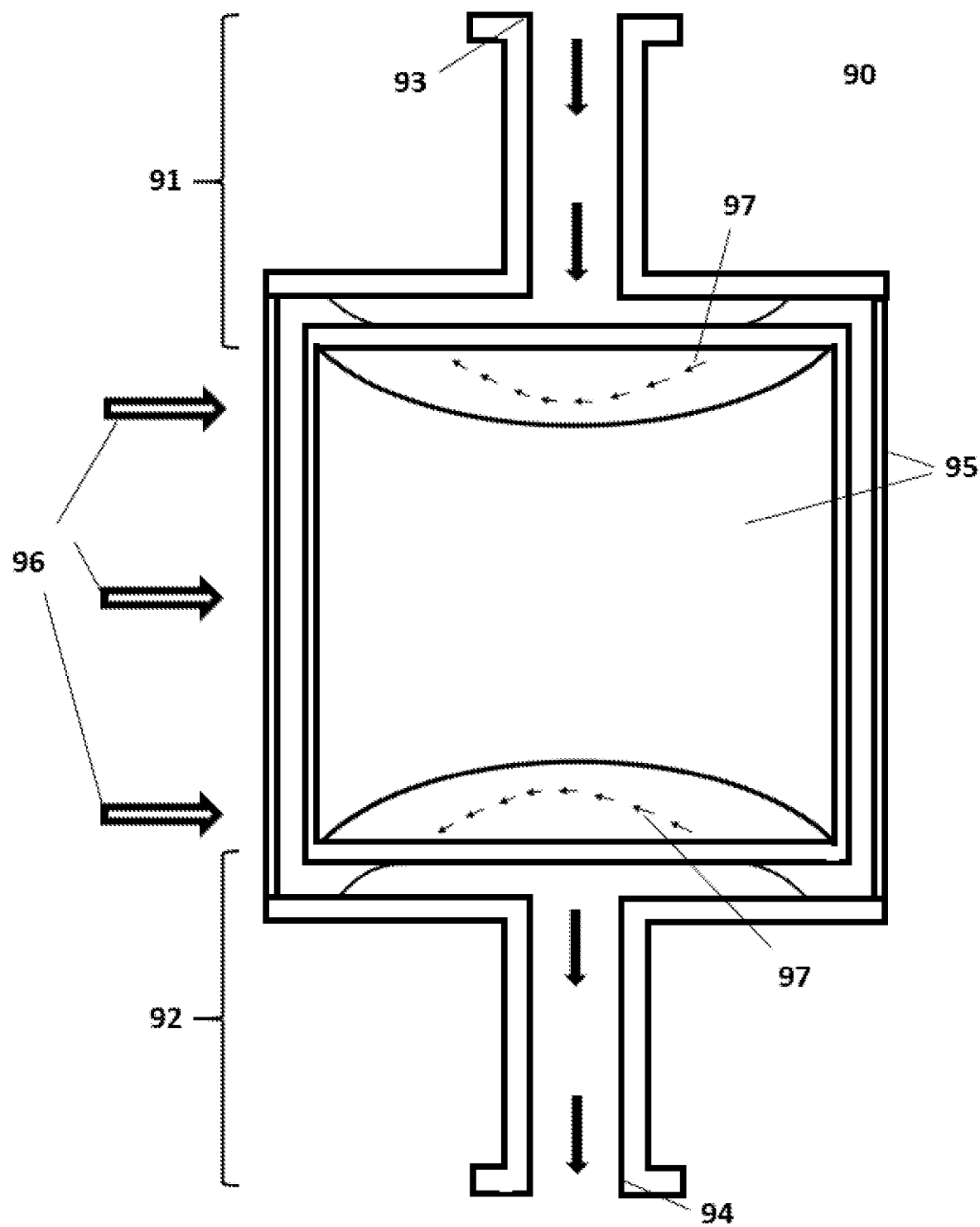
FIG. 10 is a cross-sectional schematic representation of an alternative hollow rotor that may be used with the solar receivers described here.

FIG. 10 shows a cross-sectional schematic representation of an alternative hollow rotor 90. Rotor 90 is similar in concept to the rotor of FIG. 9 but has replaced the plurality of conduits with a hollow cylindrical wall 95 that extends around and between the circumferential periphery of the discoidal first body portion 91 and the second body portion 92. In a similar manner to the rotor of FIG. 9, the rotor 90 of FIG. 10 has an inlet 93 in the first body portion 91. In use, working fluid may flow into the hollow part of the first body portion 91 through the inlet and into the hollow part of the cylindrical wall 95. The cylindrical wall 95 is in fluid communication with both the hollow part of the first body portion 91 and the hollow part of the second body portion 92 such that the working fluid will flow over the inner surfaces of the cylindrical wall 95, into the second body portion 92 and out through outlet 94. In operation, the rotor 90 will rotate in a direction 97 such that the outer surface of the cylindrical wall 95 will become exposed to incident solar radiation 96 over the course of one 360° rotation event. The incident light 96 will heat the surface of the cylindrical wall 95 such that it becomes heated. Working fluid passing through the rotor 90 will pass over the inner surface of the hollow cylindrical wall such that heat is transferred from the cylindrical wall 95 to the working fluid. As each heated portion of the surface of the cylindrical wall 95 is carried away from the incident solar radiation 96 it becomes cooled. In this manner, no individual part of the rotor is exposed to the focused solar radiation for an extended period of time. It is envisaged that solar radiation may be directed towards the rotor 90 from multiple directions via any suitable means suffice that the flow of working fluid may cool each heated portion of the rotor to an suitable temperature between each exposure of that portion of the surface to incident solar radiation.

Figure 11:
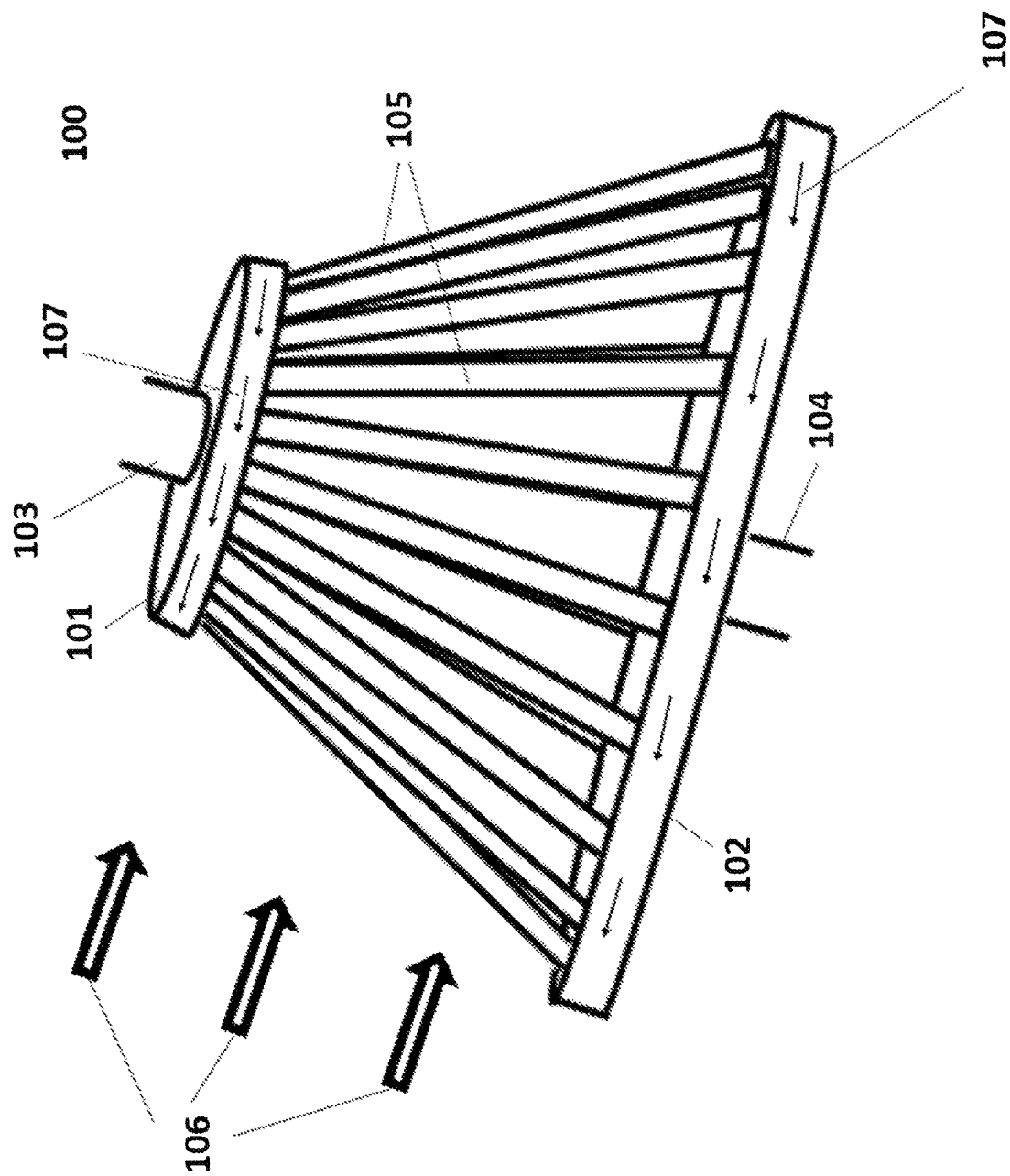
FIG. 11 is a schematic perspective view of a further alternative hollow rotor that may be used with the solar receivers described herein.

FIG. 11 shows a schematic perspective view of a further alternative hollow rotor 100 that may be used with the solar receivers described herein. Rotor 100 operates in a manner comparable to the rotor of FIG. 9 with the main difference in configuration being that rotor 100 is frustoconical in shape in contract to the cylindrical shape of rotor 80. Rotor 100 includes a first discoidal body portion 101 and a second discoidal body portion 102. An inlet 103 extends from one circular face of the first body portion 101 while an outlet extends from one circular face of the second body portion 102. For the avoidance of doubt, the inlet may instead extend from the second body portion 102 and the outlet from the first body portion 101 if desired. In the embodiment shown, the first body portion 101 is smaller in diameter than the second body portion 102 resulting in a rotor with a general frustoconical shape. A plurality of conduits 105 connect the outer circumferential periphery of the first body portion 101 and the outer circumferential periphery of the second body portion 102. Each of the plurality of conduits 105 is hollow such that the inlet 103 and outlet 104 are in fluid communication via a hollow part (not shown) of each of the first and second body portions 101, 102 and the hollow interior (not shown) of each of the plurality of conduits 105. In operation, solar radiation 106 is directed towards one or more surfaces of the rotor 100. The rotor 100 rotates in a direction 107 such that each of the plurality of conduits 105 will be gradually exposed to the incident solar radiation 106 as the rotor 100 rotates. When the solar radiation 106 contacts the surface of one of the plurality of conduits 105, the conduit will become heated. Working fluid flowing in through the inlet 103 and into the hollow part of the plurality of conduits 105 will flow over the internal heated surfaces of the conduits 105 such that heat energy is transferred from each heated conduit to the working fluid. The heated working fluid then flows into the hollow part of the second body portion 102 and through the outlet 104.

Figure 12:
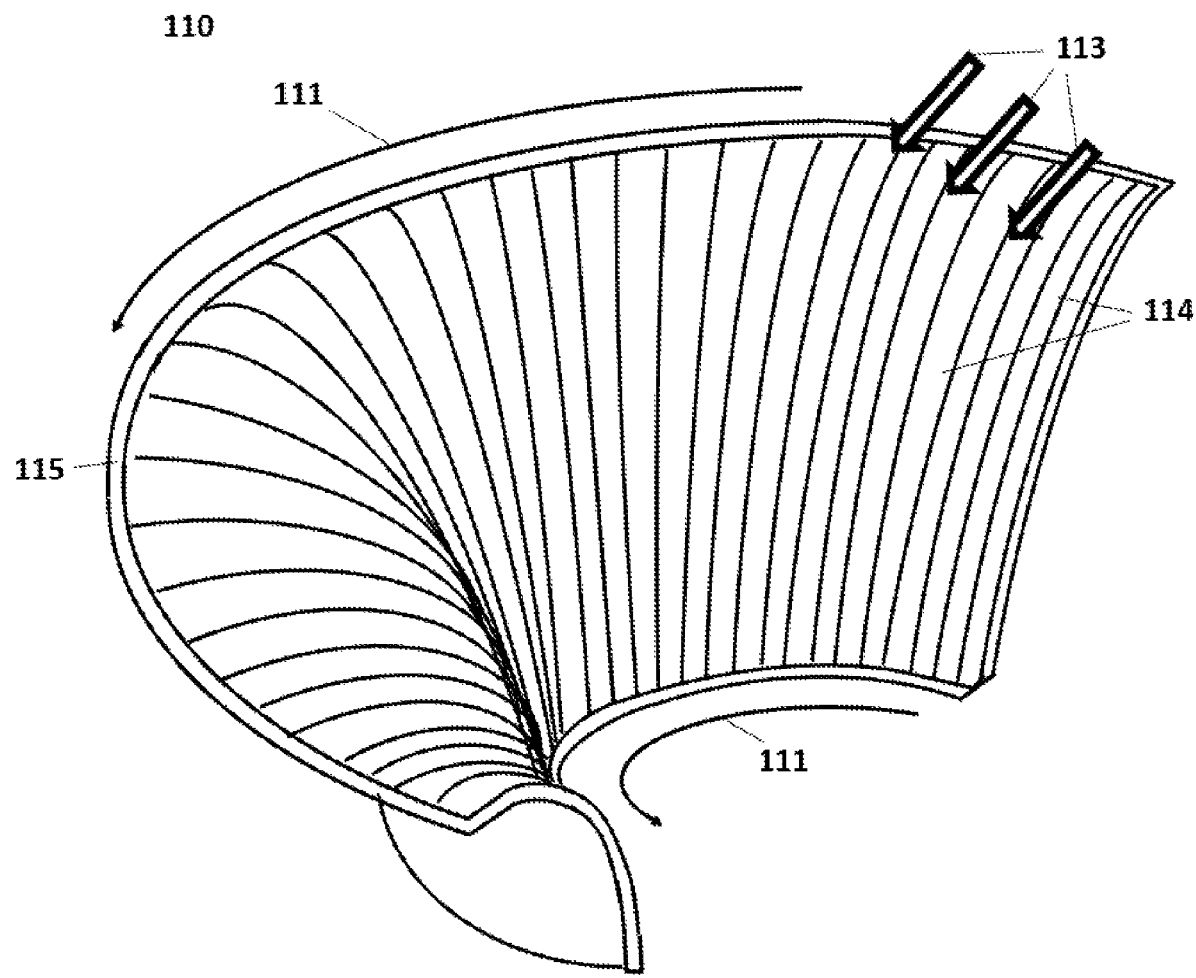
FIG. 12 is a schematic perspective view of a complex rotor design that may be used with the solar receivers described herein.

Additional complex rotor shapes may also be used in the solar receivers of the present invention. More complex rotor shapes may be selected to impart particular advantages to the solar receivers in which they are used. For example, a rotor shape may be selected to influence the specific interaction of solar radiation with the surface of the rotor. FIG. 12 shows an example of one such complex rotor 110. Rotor 110 is in the shape of a truncated cone with sides that increasingly diverge from the absent point of the cone as the sides extend away from the absent point. The resultant shape approximates the bell portion of a trumpet. Rotor 110 may be used in a solar receiver that approximates the configuration shown in FIGS. 6 to 8. Rotor 110 is formed from absorptive tiles 114 resting upon rotor body 115. The absorptive tiles 114 are curved and interlocking to provide a substantially continuous absorptive surface on the interior of the rotor. In use in an appropriately shaped solar receiver, the rotor 110 will rotate in a direction 111. Solar radiation 113 will be directed onto the surface of the absorptive tiles 114 through a slot (not shown) in a similar manner to the configuration shown in FIG. 7. Working fluid may then be passed across one or more surfaces of the rotor to cool the rotor and carry the heat away for further use such as electrical generation.

Figure 13:
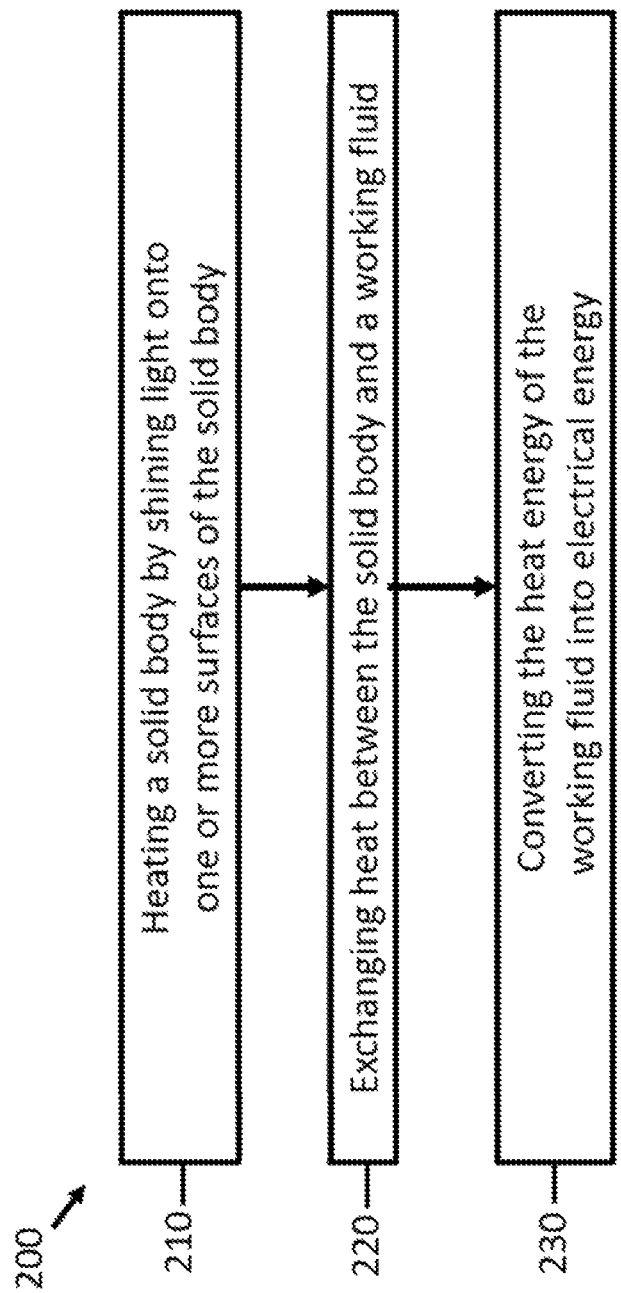
FIG. 13 is a flow diagram of a method according to the present invention.

The solar receivers described herein may be used with the method shown in FIG. 13. The method of FIG. 13 shows a flowchart describing the main method steps of the present invention. The method 200 includes: heating a solid body by shining light onto one or more surfaces of the solid body 210; exchanging heat between the solid body and a working fluid 220; and converting the heat energy of the working fluid into electrical energy 230.

The features of the examples provided may be generally be combined in any technically appropriate manner consistent with methods and solar receivers of the present invention. Additional modifications within the scope of the invention will be apparent to those skilled in the art with the benefit of this disclosure and the appended claims.

We claim:

1. A solar receiver for a concentrated solar power station operating at light concentration values of up to 20,000, the solar receiver comprising:
    a heat-absorbing solid body comprising a material with a melting point in excess of 1500° C., wherein the heat-absorbing solid body is a rotor and is frustoconical in shape, wherein the heat-absorbing solid body is hollow with an open end and an interior of the heat-absorbing solid body that is defined by an inner surface of the heat-absorbing solid body that is a truncated cone and faces the interior;
    a light focuser having a structure to focus light through the open end of the heat-absorbing solid body and onto the inner surface of the heat-absorbing solid body; and
    a heat exchanger cowl arranged to provide a flow of working fluid over the heat-absorbing solid body;
    wherein the light from the light focuser impinges over time on portions of the inner surface of the heat-absorbing solid body and heats the heat-absorbing solid body which in turn heats the working fluid proximate to the heat-absorbing solid body; and
    wherein the heat-absorbing solid body is movable relative to the heat exchanger cowl, wherein the inner surface of the heat-absorbing solid body rotates about an axis, and, after one revolution of the inner surface about the axis, the portions of the inner surface define a continuous portion that surrounds the axis and is exposed to the light.

2. The solar receiver according to claim 1, wherein the inner surface of the heat-absorbing solid body is configured to receive and store solar radiation in the form of heat.

3. The solar receiver according to claim 1, wherein the inner surface that is the truncated cone of the heat-absorbing solid body is movable from a first position to a second position, wherein one of the portions of the inner surface that is the truncated cone of the heat-absorbing solid body is heated at the first position and is cooled at the second position.

4. The solar receiver according to claim 1, wherein the heat-absorbing solid body comprises a hollow portion.

5. The solar receiver according to claim 4, wherein the heat exchanger cowl directs at least a portion of the working fluid through the hollow portion of the heat-absorbing solid body such that the working fluid flows over the inner surface that is the truncated cone of the heat-absorbing solid body.

6. The solar receiver according to claim 1, wherein the heat-absorbing solid body comprises a body and a coating, the coating comprising the material with the melting point in excess of 1500° C., the material having a solar absorptance in excess of 0.8.

7. The solar receiver according to claim 6, further comprising an insulating layer between the body of the heat-absorbing solid body and the coating.

8. The solar receiver according to claim 1, wherein the inner surface of the heat-absorbing solid body comprises one or more adsorptive tiles configured to receive and store solar radiation; and
    the heat-absorbing solid body comprises:
        one or more impingement heat shield plates configured to cool the heat-absorbing solid body and protect components of the solar receiver from excess temperatures during use; and
        a body configured to seat the one or more adsorptive tiles and the one or more impingement heat shield plates.

9. The solar receiver according to claim 1, wherein the heat exchanger cowl comprises:
    an inlet through which the working fluid flows;
    an outlet; and
    one or more fluid channels formed entirely within a body of the heat exchanger cowl and configured such that the working fluid flowing through the inlet will pass across one or more surfaces of the heat-absorbing solid body prior to passing through the outlet.

10. The solar receiver according to claim 9, wherein the heat exchanger cowl further comprises an insulating layer.

11. The solar receiver according to claim 9, wherein the heat exchanger cowl comprises one or more impingement holes configured to provide cooling to the heat-absorbing solid body separate from the working fluid flow.

12. The solar receiver according to claim 1, further comprising a control system and one or more sensors communicably coupled to the control system.

13. The solar receiver according to claim 12, wherein the control system is configured to increase speed of movement of the heat-absorbing solid body in response to detection of an increase in light incident upon the one or more sensors, and/or to decrease the speed of movement of the heat-absorbing solid body in response to detection of a decrease in incident light upon the one or more sensors.

14. The solar receiver according to claim 1, wherein the material comprises zirconium, zirconium oxide and/or cermets thereof, zirconium bromide and/or cermets thereof, chromium oxide and/or cermets thereof, aluminum oxide and/or cermets thereof, molybdenum, steel, steel alloys, tungsten, high refractive index polymer, high temperature resistant absorptive black paint, silicon carbide, or combinations thereof.

15. The solar receiver according to claim 1, wherein the working fluid is selected from a group consisting of air, helium, carbon dioxide, and any combination thereof.

16. The solar receiver according to claim 1, wherein the heat exchanger cowl has a slot into which the light focused by the light focuser passes through and impinges upon the inner surface that is the truncated cone of the heat-absorbing solid body.

17. The solar receiver according to claim 16, wherein the heat exchanger cowl is in the shape of a truncated cone.

18. The solar receiver according to claim 1, wherein the heat exchanger cowl is arranged to provide the flow of the working fluid independent of a structure of the heat exchanger cowl that allows the light focused by the light focuser to impinge upon the inner surface that is the truncated cone of the heat-absorbing solid body.

19. The solar receiver according to claim 1, wherein the heat exchanger cowl is in the shape of a truncated cone.

20. A concentrated solar power station comprising:
one or more mirrors, lenses, heliostats and/or reflectors; and
a receiving mast comprising a solar receiver comprising:
a heat-absorbing solid body comprising a material with a melting point in excess of 1500° C., wherein the heat-absorbing solid body is a rotor and is frusto-conical in shape, wherein the heat-absorbing solid body is hollow with an open end and an interior of the heat-absorbing solid body that is defined by an inner surface of the heat-absorbing solid body that is a truncated cone and faces the interior;
a light focuser having a structure to focus light through the open end of the heat-absorbing solid body and onto the inner surface of the heat-absorbing solid body; and
a heat exchanger cowl arranged to provide a flow of working fluid over the heat-absorbing solid body;
wherein the light from the light focuser impinges over time on portions of the inner surface of the heat-absorbing solid body and heats the heat-absorbing solid body which in turn heats the working fluid proximate to the heat-absorbing solid body; and
wherein the heat-absorbing solid body is movable relative to the heat exchanger cowl, wherein the inner surface of the heat-absorbing solid body rotates about an axis, and, after one revolution of the inner surface about the axis, the portions of the inner surface define a continuous portion that surrounds the axis and is exposed to the light.

21. The concentrated solar power station according to claim 20, further comprising a generation system configured to convert heat energy from the working fluid into electrical energy.

22. The concentrated solar power station according to claim 20, wherein the heat exchanger cowl has a slot into which the light focused by the light focuser passes through and impinges upon the inner surface that is the truncated cone of the heat-absorbing solid body.

23. The concentrated solar power station according to claim 22, wherein the heat exchanger cowl is in the shape of a truncated cone.

24. The concentrated solar power station according to claim 20, wherein the heat exchanger cowl is arranged to provide the flow of the working fluid independent of a structure of the heat exchanger cowl that allows the light focused by the light focuser to impinge upon the inner surface that is the truncated cone of the heat-absorbing solid body.

25. The concentrated solar power station according to claim 20, wherein the heat exchanger cowl is in the shape of a truncated cone.

26. A method for converting light into electrical energy, comprising:
a) providing a solar receiver comprising:
a heat-absorbing solid body comprising a material with a melting point in excess of 1500° C., wherein the heat-absorbing solid body is a rotor and is frusto-conical in shape, wherein the heat-absorbing solid body is hollow with an open end and an interior of the heat-absorbing solid body that is defined by an inner surface of the heat-absorbing solid body that is a truncated cone and faces the interior;
a light focuser having a structure to focus light through the open end of the heat-absorbing solid body and onto the inner surface of the heat-absorbing solid body; and
a heat exchanger cowl arranged to provide a flow of working fluid over the heat-absorbing solid body;
wherein the light from the light focuser impinges over time on portions of the inner surface of the heat-absorbing solid body and heats the heat-absorbing solid body which in turn heats the working fluid proximate to the heat-absorbing solid body; and
wherein the heat-absorbing solid body is movable relative to the heat exchanger cowl, wherein the inner surface of the heat-absorbing solid body rotates about an axis, and, after one revolution of the inner surface about the axis, the portions of the inner surface define a continuous portion that surrounds the axis and is exposed to the light;
b) heating the solar receiver, wherein the heating comprises shining light onto one or more surfaces of the heat-absorbing solid body of the solar receiver;
c) moving the heat-absorbing solid body from a first position to a second position;
d) exchanging heat between the heat-absorbing solid body and the working fluid; and
e) converting heat energy of the working fluid into electrical energy.

27. The method according to claim 26, wherein the heat exchanger cowl has a slot into which the light focused by the light focuser passes through and impinges upon the inner surface that is the truncated cone of the heat-absorbing solid body.

28. The method according to claim 27, wherein the heat exchanger cowl is in the shape of a truncated cone.

29. The method according to claim 26, wherein the heat exchanger cowl is arranged to provide the flow of the working fluid independent of a structure of the heat exchanger cowl that allows the light focused by the light focuser to impinge upon the inner surface that is the truncated cone of the heat-absorbing solid body.

30. The method according to claim 26, wherein the heat exchanger cowl is in the shape of a truncated cone.

* * * * *